US010212636B2

(12) United States Patent
Damnjanovic et al.

(10) Patent No.: US 10,212,636 B2
(45) Date of Patent: Feb. 19, 2019

(54) TECHNIQUES FOR MANAGING HANDOVERS IN AN UNLICENSED RADIO FREQUENCY SPECTRUM BAND

(71) Applicant: QUALCOMM Incorporated, San Diego, CA (US)

(72) Inventors: Aleksandar Damnjanovic, Del Mar, CA (US); Madhavan Srinivasan Vajapeyam, San Diego, CA (US); Ravindra Manohar Patwardhan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 14/956,686

(22) Filed: Dec. 2, 2015

(65) Prior Publication Data

US 2016/0174095 A1 Jun. 16, 2016

Related U.S. Application Data

(60) Provisional application No. 62/091,295, filed on Dec. 12, 2014.

(51) Int. Cl.
*H04W 16/14* (2009.01)
*H04W 36/24* (2009.01)
(Continued)

(52) U.S. Cl.
CPC ........... *H04W 36/24* (2013.01); *H04W 36/30* (2013.01); *H04W 16/14* (2013.01); *H04W 24/10* (2013.01)

(58) Field of Classification Search
CPC ..... H04W 24/10; H04W 36/00; H04W 36/30; H04W 16/14; H04W 72/04; H04W 72/08;
(Continued)

(56) References Cited

U.S. PATENT DOCUMENTS 9,125,216 B1 * 9/2015 Choi ................... H04W 72/082
2009/0257398 A1 * 10/2009 Koyanagi ............. H04W 48/18
370/331

(Continued)

FOREIGN PATENT DOCUMENTS

EP         1519518 A2 *  3/2005  ......... H04L 27/0012
WO    WO 2013179095 A1 * 12/2013  ............ H04W 16/14
WO    WO-2013179095 A1   12/2013

OTHER PUBLICATIONS

Qualcomm Europe, Uplink Channel Measurements in Neighboring Cells, Aug. 20-24, 2007, 3GPP TSG-RAN WG2 #59, R2-073301, pp. 1-3.*

(Continued)

*Primary Examiner* — Andrew W Chriss
*Assistant Examiner* — Lalita W Pace
(74) *Attorney, Agent, or Firm* — Dalei Dong; Holland & Hart

(57) ABSTRACT

Techniques for managing handovers in an unlicensed radio frequency spectrum band may provide that a serving base station may receive one or more base station measurement reports and one or more UE measurement reports. The base station measurement reports may include information associated with one or more devices that may transmit signals using an unlicensed radio frequency spectrum band. The UE measurement reports may include information associated with one or more devices that may generate interfering signals at the UE, which may include interfering signals from one or more devices that are not detected by the serving base station. The serving base station may, in some examples, determine whether to handover the UE to a second base station based at least in part on the base station measurement report and the UE measurement report.

30 Claims, 13 Drawing Sheets

(51) Int. Cl.
*H04W 36/30* (2009.01)
*H04W 24/10* (2009.01)

(58) Field of Classification Search
CPC .. H04W 28/08; H04W 36/0083; H04W 36/24
See application file for complete search history.

(56) References Cited

U.S. PATENT DOCUMENTS

| | | | |
|---|---|---|---|
| 2011/0013599 A1* | 1/2011 | Shukla | H04W 36/30 370/332 |
| 2012/0020231 A1* | 1/2012 | Chen | H04W 36/08 370/252 |
| 2013/0322279 A1 | 12/2013 | Chincholi et al. | |
| 2015/0141015 A1* | 5/2015 | Zhang | H04W 36/0061 455/436 |
| 2016/0066204 A1 | 3/2016 | Khawer et al. | |
| 2016/0073405 A1* | 3/2016 | Khawer | H04L 5/0007 370/329 |
| 2016/0135100 A1* | 5/2016 | Teyeb | H04W 36/0055 370/331 |
| 2016/0249351 A1* | 8/2016 | Wang | H04W 72/1231 |
| 2016/0301504 A1* | 10/2016 | Toskala | H04W 48/16 |

OTHER PUBLICATIONS

Qualcomm Europe, "Uplink Channel Measurements in Neighboring Cells," 3GPP TSG-RAN #59, R2-073301, Athens, Greece, Aug. 20-24, 2007 (Year: 2007).*

Alcatel-Lucent Shanghai Bell et al., "Hidden Node Problem and Potential Solutions for LAA," 3GPP TSG RAN WG1 Meeting #78bis, R1-144084, Ljubljana, Slovenia, Oct. 6-10, 2014, 4 pgs., 3rd Generation Partnership Project.

ISA/EPO, International Search Report and Written Opinion of the International Searching Authority, Int'l App. No. PCT/US2015/063643, dated Feb. 10, 2016, European Patent Office, Rijswijk, NL, 15 pgs.

Qualcomm Europe, "Uplink Channel Measurements in Neighboring Cells," 3GPP TSG-RAN WG2 #59, R2-073301, Athens, Greece, Aug. 20-24, 2007, 3 pgs., 3rd Generation Partnership Project.

* cited by examiner

TECHNIQUES FOR MANAGING HANDOVERS IN AN UNLICENSED RADIO FREQUENCY SPECTRUM BAND

CROSS REFERENCES

The present Application for Patent claims priority to U.S. Provisional Patent Application No. 62/091,295 by Damnjanovic et al., entitled "Techniques for Managing Handovers in an Unlicensed Radio Frequency Spectrum Band," filed Dec. 12, 2014, assigned to the assignee hereof, which is hereby incorporated by reference in its entirety.

BACKGROUND

Field of the Disclosure

The present disclosure, for example, relates to wireless communication systems, and more particularly to techniques for managing handovers in an unlicensed radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Some modes of communication may enable communications between a base station and a UE over an unlicensed or shared radio frequency spectrum band, or over different radio frequency spectrum bands (e.g., a licensed radio frequency spectrum band or an unlicensed radio frequency spectrum band) of a cellular network. With increasing data traffic in cellular networks that use a licensed radio frequency spectrum band, offloading of at least some data traffic to an unlicensed or unlicensed radio frequency spectrum band may provide a cellular operator with opportunities for enhanced data transmission capacity. An unlicensed radio frequency spectrum band may also provide service in areas where access to a licensed radio frequency spectrum band is unavailable.

Prior to gaining access to, and communicating over, an unlicensed radio frequency spectrum band, a base station or UE may perform a listen before talk (LBT) procedure to contend for access to the unlicensed radio frequency spectrum band. An LBT procedure may include performing a clear channel assessment (CCA) procedure to determine whether a channel of the unlicensed radio frequency spectrum band is available. When it is determined that the channel of the unlicensed radio frequency spectrum band is available, a channel usage beacon signal (CUBS) may be transmitted to reserve the channel.

In some modes of operation, a UE and a serving base station may operate using an unlicensed radio frequency spectrum band in which the serving base station may not detect one or more other transmitting device that may transmit using the unlicensed radio frequency spectrum band. For example, the serving base station may transmit using the unlicensed radio frequency spectrum band in a time division multiplexing manner with another base station which may result in the serving base station transmitting at the same time as the other device(s) and not detecting the signals of the other device(s). In other examples, the other device(s) may be outside of an energy detection range of the serving base station, but close enough to the UE to cause interference. In such cases, it may be desirable to serve the UE through a different base station.

SUMMARY

The present disclosure, for example, relates to one or more techniques for managing handovers in an unlicensed radio frequency spectrum band. In some examples, a serving base station may receive one or more base station measurement reports that may include information associated with one or more nodes that may transmit signals using an unlicensed radio frequency spectrum band. The base station measurement report may include, in some examples, information on one or more nodes that are not detected by the serving base station, such as due to time division multiplexing of the serving base station, or the nodes being outside of an energy detection or preamble detection range of the serving base station, for example. The serving base station also may receive a UE measurement report that may include information associated with one or more nodes that may generate interfering signals at the UE, which may include interfering signals from one or more nodes that are not detected by the serving base station. The serving base station may, in some examples, determine whether to handover the UE to a second base station (e.g., a target base station) based at least in part on the base station measurement report and the UE measurement report.

A method of wireless communication at a wireless device is described. The method may include receiving, at a first base station, a base station measurement report comprising information associated with one or more first devices that transmits first signals using an unlicensed radio frequency spectrum band, and receiving, at the first base station, a UE measurement report comprising information associated with one or more second devices that transmits second signals on the unlicensed radio frequency spectrum band.

An apparatus for wireless communication at a wireless device is described. The apparatus may include means for receiving, at a first base station, a base station measurement report comprising information associated with one or more first devices that transmits first signals using an unlicensed radio frequency spectrum band, and means for receiving, at the first base station, a UE measurement report comprising information associated with one or more second devices that transmits second signals on the unlicensed radio frequency spectrum band.

A further apparatus for wireless communication at a wireless device is described. The apparatus may include a processor, memory in electronic communication with the processor, and instructions stored in the memory, wherein the instructions are executable by the processor to receive, at a first base station, a base station measurement report comprising information associated with one or more first devices that transmits first signals using an unlicensed radio frequency spectrum band, and receive, at the first base station, a UE measurement report comprising information associated with one or more second devices that transmits second signals on the unlicensed radio frequency spectrum band.

A non-transitory computer-readable medium storing code for wireless communication at a wireless device is described. The code may include instructions executable to receive, at a first base station, a base station measurement report comprising information associated with one or more first devices that transmits first signals using an unlicensed radio frequency spectrum band, and receive, at the first base station, a UE measurement report comprising information associated with one or more second devices that transmits second signals on the unlicensed radio frequency spectrum band.

In some examples of the method, apparatuses, or non-transitory computer-readable medium described above, a determination may be made whether to handover the UE to a second base station based at least in part on the base station measurement report and the UE measurement report. In some examples, the one or more first devices comprise one or more of a non-serving base station or a non-serving wireless local area network (WLAN) access point (AP). Additionally or alternatively, in some examples the one or more second devices comprise one or more of a non-serving base station or a non-serving WLAN access point (AP).

In some examples of the method, apparatuses, or non-transitory computer-readable medium described above, the one or more first devices are within an energy detection range of a base station that provided the base station measurement report. Additionally or alternatively, in some examples the one or more second devices are within an energy detection range of the UE.

In some examples of the method, apparatuses, or non-transitory computer-readable medium described above, the one or more devices is out of an energy detection range of the first base station. Additionally or alternatively, some examples may include receiving signals at time intervals that are different from time intervals of transmissions of at least one of the one or more devices.

In some examples of the method, apparatuses, or non-transitory computer-readable medium described above, the determining whether to handover the UE to the second base station comprises determining that at least one of the one or more devices is causing interference at the UE with signals transmitted from the first base station on the unlicensed radio frequency spectrum band, and determining that the second base station can transmit signals to the UE with reduced interference relative to the first base station. Additionally or alternatively, in some examples the determining whether to handover the UE to the second base station further comprises one or more of determining that a signal strength of transmissions of the second base station at the UE exceeds a threshold value, determining that the second base station is within an energy detection range of the at least one of the one or more devices that is causing interference at the UE, and determining that the second base station is within an energy detection range of the first base station.

In some examples of the method, apparatuses, or non-transitory computer-readable medium described above, a signal strength of the first base station at the UE exceeds a signal strength of the second base station at the UE. Additionally or alternatively, some examples may include transmitting a handover command to the UE to initiate communications between the UE and the second base station.

In some examples of the method, apparatuses, or non-transitory computer-readable medium described above, the base station measurement report comprises an identification and an energy measurement of at least one of a non-serving base station or a non-serving WLAN AP. Additionally or alternatively, in some examples the base station measurement report further comprises preamble detection information for at least one of the non-serving base station or the non-serving WLAN AP.

In some examples of the method, apparatuses, or non-transitory computer-readable medium described above, the base station measurement report is received via a backhaul link. Additionally or alternatively, in some examples the UE measurement report comprises an energy measurement associated with one or more of the second signals received at the UE from at least one of the one or more second devices.

In some examples of the method, apparatuses, or non-transitory computer-readable medium described above, the UE measurement report comprises a plurality of measurements taken on a plurality of frequencies of the unlicensed radio frequency spectrum band that are different from a frequency of the first base station. Additionally or alternatively, in some examples the UE measurement report comprises a plurality of measurements taken at time intervals having a duration selected to allow the UE to perform measurements of at least one of a beacon signal for WLAN AP transmissions or a demodulation reference signal (DRS) signal for other base station transmissions.

In some examples of the method, apparatuses, or non-transitory computer-readable medium described above, the determining whether to handover the UE to the second base station is based at least in part on a loading metric associated with the second base station. Additionally or alternatively, in some examples the loading metric comprises channel occupancy information associated with the second base station.

In some examples of the method, apparatuses, or non-transitory computer-readable medium described above, the second base station is selected based at least in part on the second base station being in an energy detection range or preamble detect range of an interfering non-serving base station or an interfering non-serving WLAN AP.

A method of wireless communication at a wireless device is described. The method may include receiving at a UE, from at least one of a non-serving base station or a non-serving WLAN AP, a signal on an unlicensed radio frequency spectrum band, measuring one or more parameters associated with the signal, transmitting a UE measurement report to a first base station, the UE measurement report based at least in part on the one or more measured parameters, and receiving, from the first base station, a handover command to initiate communications with a second base station based at least in part on the UE measurement report.

An apparatus for wireless communication at a wireless device is described. The apparatus may include means for receiving at a UE, from at least one of a non-serving base station or a non-serving WLAN AP, a signal on an unlicensed radio frequency spectrum band, means for measuring one or more parameters associated with the signal, means for transmitting a UE measurement report to a first base station, the UE measurement report based at least in part on the one or more measured parameters, and means for receiving, from the first base station, a handover command to initiate communications with a second base station based at least in part on the UE measurement report.

A further apparatus for wireless communication at a wireless device is described. The apparatus may include a processor, memory in electronic communication with the processor, and instructions stored in the memory, wherein the instructions are executable by the processor to receive at a UE, from at least one of a non-serving base station or a non-serving WLAN AP, a signal on an unlicensed radio frequency spectrum band, measure one or more parameters associated with the signal, transmit a UE measurement report to a first base station, the UE measurement report based at least in part on the one or more measured parameters, and receive, from the first base station, a handover command to initiate communications with a second base station based at least in part on the UE measurement report.

A non-transitory computer-readable medium storing code for wireless communication at a wireless device is described. The code may include instructions executable to receive at a UE, from at least one of a non-serving base station or a non-serving WLAN AP, a signal on an unlicensed radio frequency spectrum band, measure one or more parameters associated with the signal, transmit a UE measurement report to a first base station, the UE measurement report based at least in part on the one or more measured parameters, and receive, from the first base station, a handover command to initiate communications with a second base station based at least in part on the UE measurement report.

In some examples of the method, apparatuses, or non-transitory computer-readable medium described above, the UE measurement report comprises information associated with a second base station from a same deployment as the first base station or a third base station from a different deployment as the first base station. Additionally or alternatively, in some examples the UE measurement report comprises information associated with one or more WLAN APs that are undetectable by the first base station.

In some examples of the method, apparatuses, or non-transitory computer-readable medium described above, the UE measurement report comprises a plurality of measurements taken on a plurality of frequencies of the unlicensed radio frequency spectrum band that are different than a frequency of the first base station. Additionally or alternatively, in some examples the UE measurement report comprises a plurality of measurements taken at time intervals having a duration selected to allow the UE to perform measurements of at a least one of a beacon signal for a WLAN AP or a DRS signal for the non-serving base station.

Some examples of the method, apparatuses, or non-transitory computer-readable medium described above may further include performing preamble detection for the signal, and the UE measurement report further comprises preamble detection information associated with the signal.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
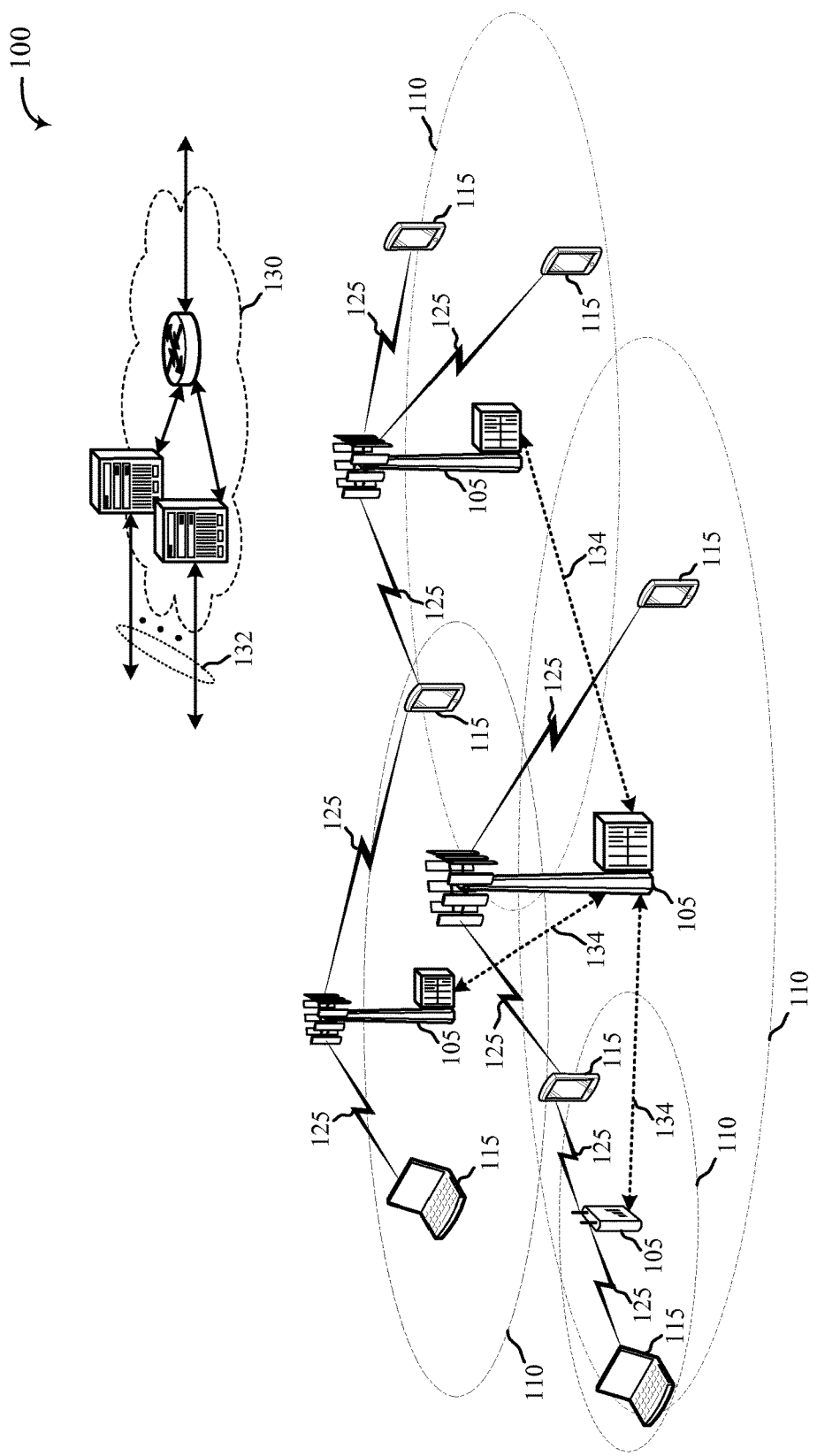
FIG. 1 illustrates an example of a wireless communication system, in accordance with aspects of the disclosure.

Techniques are described in which an unlicensed radio frequency spectrum band is used for at least a portion of communications over a wireless communication system. In some examples, the unlicensed radio frequency spectrum band may be used for Long Term Evolution (LTE) communications or LTE-Advanced (LTE-A) communications. The unlicensed radio frequency spectrum band may be used in combination with, or independent from, a licensed radio frequency spectrum band. In some examples, the unlicensed radio frequency spectrum band may be a radio frequency spectrum band for which a device may need to contend for access because the radio frequency spectrum band is available, at least in part, for unlicensed use, such as Wi-Fi use.

With increasing data traffic in cellular networks that use a licensed radio frequency spectrum band, offloading of at least some data traffic to an unlicensed radio frequency spectrum band may provide a cellular operator (e.g., an operator of a public land mobile network (PLMN) or a coordinated set of base stations defining a cellular network, such as an LTE/LTE-A network) with opportunities for enhanced data transmission capacity. Use of an unlicensed radio frequency spectrum band may also provide service in areas where access to a licensed radio frequency spectrum band is unavailable. As noted above, before communicating over an unlicensed radio frequency spectrum band, transmitting apparatuses may perform an LBT procedure to gain access to the medium. Such an LBT procedure may include performing a CCA procedure (or extended CCA procedure) to determine whether a channel of the unlicensed radio frequency spectrum band is available. When it is determined that the channel of the unlicensed radio frequency spectrum band is available, a CUBS may be transmitted to reserve the channel. When it is determined that a channel is not available, a CCA procedure (or extended CCA procedure) may be performed for the channel again at a later time.

After winning contention for access to an unlicensed radio frequency spectrum band, a base station may transmit signals to one or more UEs. In some situations, the signals transmitted to the one or more UEs may experience interference from one or more other nodes that may transmit using the unlicensed radio frequency spectrum. For example, the base station may not detect that a wireless local area network (WLAN) access point (AP) may be transmitting signals using a same portion of the unlicensed radio frequency spectrum band as the base station, which may cause interference with signals received at the UE(s). Such a WLAN AP may not be detected due to, for example, the WLAN AP being outside of an energy detection range of the base station, or due to the base station operating in a time division multiplexed manner with other base stations which may prevent the base station from detecting the interfering WLAN AP. In some examples, such an interfering node may be another base station that may be part of a different deployment than the base station serving the UE, and that the serving base station may not detect for similar reasons as mentioned above. Such an interfering WLAN AP or base station (or other interfering device transmitting using the unlicensed radio frequency spectrum band), may be referred to as a hidden node that is not detected by a serving base station. According to various aspects of the disclosure, in the event that a UE experiences interference from a hidden node, the UE may be handed over from a serving base station to a target base station that may reduce such interference and provide for more efficient communications with the UE.

In some examples, a serving base station may receive information related to one or more undetected transmitting devices, which may include one or more hidden nodes, through one or more base station measurement reports from other base stations. In some examples, a UE measurement report may be used to determine that the UE is experiencing interference from an interfering node, and one or more base station measurement reports may be used to determine that another base station may be able to better serve the UE. Based at least in part on the UE measurement report(s) and/or base station measurement report(s), a serving base station may initiate a handover of the UE from the serving base station to a target base station.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100, in accordance with various aspects of the disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X2, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, WLAN APs, and the like.

The communication links 125 shown in wireless communication system 100 may include downlink (DL) transmissions, from a base station 105 to a UE 115, or uplink (UL) transmissions, from a UE 115 to a base station 105. The downlink transmissions may also be called forward link transmissions, while the uplink transmissions may also be called reverse link transmissions. In some examples, UL transmissions may include transmissions of uplink control information, which uplink control information may be transmitted over an uplink control channel (e.g., a physical uplink control channel (PUCCH) or enhanced PUCCH (ePUCCH)). The uplink control information may include, for example, acknowledgements or non-acknowledgements of downlink transmissions, or channel state information. UL transmissions may also include transmissions of data, which data may be transmitted over a physical uplink shared channel (PUSCH) or enhanced PUSCH (ePUSCH). UL transmissions may also include the transmission of a sounding reference signal (SRS) or enhanced SRS (eSRS), a physical random access channel (PRACH) or enhanced PRACH (ePRACH) (e.g., in the standalone mode described with reference to FIG. 2), or a scheduling request (SR) or enhanced SR (eSR) (e.g., in the standalone mode described with reference to FIG. 2). References in this disclosure to a PUCCH, a PUSCH, a PRACH, an SRS, or an SR are presumed to inherently include references to a respective ePUCCH, ePUSCH, ePRACH, eSRS, or eSR.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some examples, the wireless communication system 100 may support operation over a licensed radio frequency spectrum band (e.g., a radio frequency spectrum band for which transmitting apparatuses may not contend for access because the radio frequency spectrum band is licensed to one or more users for some uses, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for shared use by multiple users, such as Wi-Fi use). Upon winning a contention for access to the unlicensed radio frequency spectrum band, a transmitting apparatus (e.g., a base station 105 or UE 115) may transmit one or more CUBS over the unlicensed radio frequency spectrum band. The CUBS may reserve the unlicensed radio frequency spectrum by providing a detectable energy on the unlicensed radio frequency spectrum band. The CUBS may also serve to identify the transmitting apparatus or serve to synchronize the transmitting apparatus and a receiving apparatus.

Figure 2:
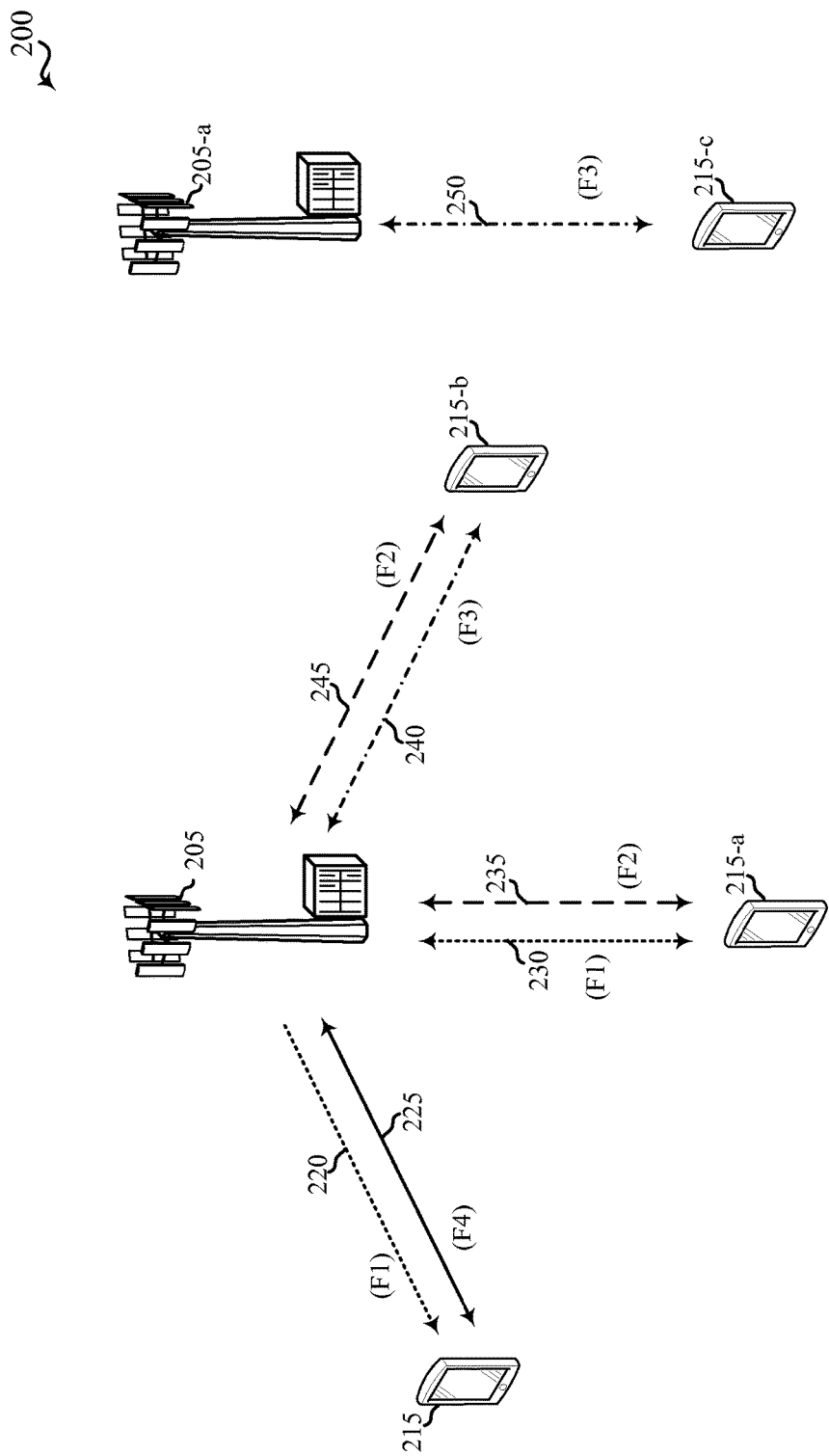
FIG. 2 shows a wireless communication system in which LTE/LTE-A may be deployed under different scenarios using an unlicensed radio frequency spectrum band, in accordance with aspects of the present disclosure.

FIG. 2 shows a wireless communication system 200 in which LTE/LTE-A may be deployed under different scenarios using an unlicensed radio frequency spectrum band, in accordance with various aspects of the present disclosure. More specifically, FIG. 2 illustrates examples of a supplemental downlink mode (also referred to as an unlicensed downlink mode), a carrier aggregation mode, and a standalone mode in which LTE/LTE-A may be deployed using an unlicensed radio frequency spectrum band. The wireless communication system 200 may be an example of portions of the wireless communication system 100 described with reference to FIG. 1. Moreover, a first base station 205 and a second base station 205-a may be examples of aspects of one or more of the base stations 105 described with reference to FIG. 1, while a first UE 215, a second UE 215-a, a third UE 215-b, and a fourth UE 215-c may be examples of aspects of one or more of the UEs 115 described with reference to FIG. 1.

In the example of a supplemental downlink mode in the wireless communication system 200, the first base station 205 may transmit OFDMA waveforms to the first UE 215 using a downlink channel 220. The downlink channel 220 may be associated with a frequency F1 in an unlicensed radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a licensed radio frequency spectrum and needs to relieve some of the traffic or signaling congestion.

In one example of a carrier aggregation mode in the wireless communication system 200, the first base station 205 may transmit OFDMA waveforms to the second UE 215-a using a second bidirectional link 230 and may receive OFDMA waveforms, SC-FDMA waveforms, or resource block interleaved FDMA waveforms from the second UE 215-a using the second bidirectional link 230. The second bidirectional link 230 may be associated with the frequency F1 in the unlicensed radio frequency spectrum band. The first base station 205 may also transmit OFDMA waveforms to the second UE 215-a using a third bidirectional link 235 and may receive SC-FDMA waveforms from the second UE 215-a using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink described above, this scenario may occur with any service provider (e.g., MNO) that uses a licensed radio frequency spectrum and needs to relieve some of the traffic or signaling congestion.

In another example of a carrier aggregation mode in the wireless communication system 200, the first base station 205 may transmit OFDMA waveforms to the third UE 215-b using a fourth bidirectional link 240 and may receive OFDMA waveforms, SC-FDMA waveforms, or resource block interleaved waveforms from the third UE 215-b using the fourth bidirectional link 240. The fourth bidirectional link 240 may be associated with a frequency F3 in the unlicensed radio frequency spectrum band. The first base station 205 may also transmit OFDMA waveforms to the third UE 215-b using a fifth bidirectional link 245 and may receive SC-FDMA waveforms from the third UE 215-b using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a licensed radio frequency spectrum band and use an unlicensed radio frequency spectrum band for capacity offload.

As described above, one type of service provider that may benefit from the capacity offload offered by using LTE/LTE-A in an unlicensed radio frequency spectrum band is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum band (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). The carrier aggregation mechanisms supported when using an unlicensed radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-a may transmit OFDMA waveforms to the fourth UE 215-c using a bidirectional link 250 and may receive OFDMA waveforms, SC-FDMA waveforms, or resource block interleaved FDMA waveforms from the fourth UE 215-c using the bidirectional link 250. The bidirectional link 250 may be associated with the frequency F3 in the unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

Figure 3:
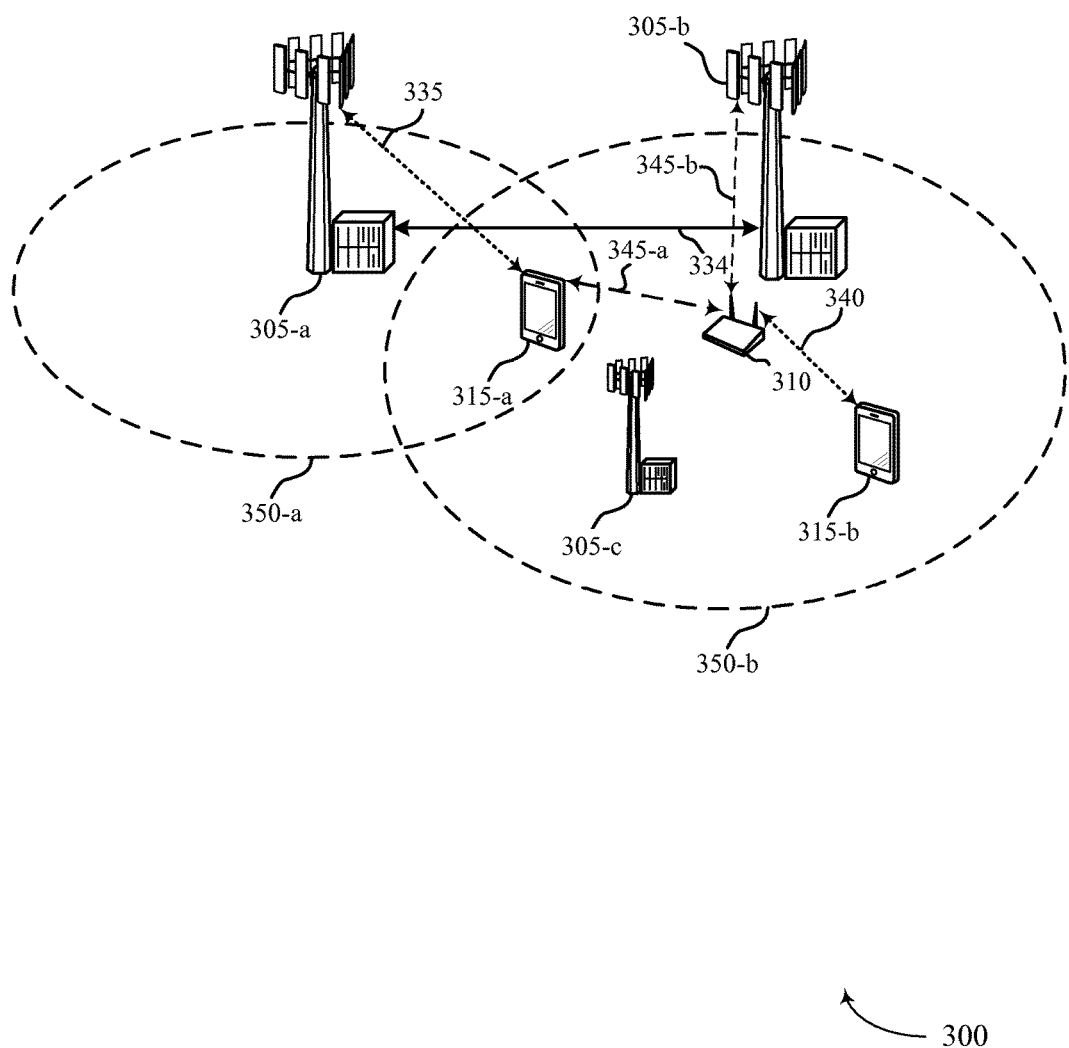
FIG. 3 shows a wireless communication system in which one or more nodes may generate an interfering signal at a UE, in accordance with aspects of the present disclosure.

FIG. 3 shows a wireless communication system 300 in which one or more nodes may generate an interfering signal at a UE, in accordance with various aspects of the present disclosure. The wireless communication system 300 may be an example of portions of the wireless communication system 100 or 200 described with reference to FIG. 1 or 2. Moreover, base stations 305 of FIG. 3 may be examples of aspects of one or more of the base stations 105, or 205 described with reference to FIG. 1 or 2, while UEs 315 of FIG. 3 may be examples of aspects of one or more of the UEs 115 or 215 described with reference to FIG. 1 or 2.

As illustrated in the example of FIG. 3, wireless communication system 300 may include a first base station 305-a that may act as a serving base station to a first UE 315-a, and may communicate with the first UE 315-a through a communication link 335. As discussed above, in some situations first UE 315-a may experience interference in the reception and/or transmission of signals on communication link 335 from one or more interfering signals 345-a that may be received from a WLAN AP 310. For example, the WLAN AP 310 may be within an energy detection range or preamble detection (PD) range of the first UE 315-a. WLAN AP 310 may be in Wi-Fi communications, for example, with a second UE 315-b via communication link 340. The first base station 305-a may not detect transmissions from WLAN AP 310 because, for example, the WLAN AP 310 may not be within an energy detection range or PD range 350-a of the first base station 305-a. The WLAN AP 310 may be within an energy detection range or PD range 350-b of the second base station 305-b, for example, the second base station 305-b may detect transmission via communication link 340 between the WLAN AP 310 and the second UE 315-b. In some examples the second base station 305-b may receive signals 345-b from the WLAN AP 310.

For example, the second base station 305-b may detect one or more transmissions of WLAN AP 310. The second base station 305-b may determine information related to the WLAN AP 310 based at least in part on the detected transmissions of WLAN AP 310. The second base station 305-b may generate a base station measurement report of one or more nodes (e.g., WLAN AP 310 and/or third base station 305-c) within an energy detection range or PD range 350-b of the second base station 305-b. The second base station 305-b may include information related to the WLAN AP 310 in a base station measurement report that may be provided to the first base station 305-a via a backhaul communication link 334 (e.g., an X2 interface such as X2 interface 134 of FIG. 1). The base station measurement report of the second base station 305-b may also include information related to a third base station 305-c, which may transmit signals using the unlicensed radio frequency spectrum band according to a different deployment (e.g., deployed by a different public land mobile network (PLMN) operator) than a deployment of the first base station 305-a or second base station 305-b.

Additionally, according to various examples, the first UE 315-a may generate and transmit a UE measurement report that may indicate that the interfering signal 345-a from the WLAN AP 310 is causing interference at the first UE 315-a. The UE measurement report may be transmitted to the first base station 305-a via communication link 335. The UE measurement report may include, for example, measurements of signals received from base station(s) from the same deployment and different deployments from the first base station 305-a, and measurement information for signals detected from WLAN APs such as WLAN AP 310. Such measurements may be performed by the first UE 315-a on carrier frequencies different from a serving carrier frequency of the first base station 305-a, as well as measurements from the serving carrier frequency. In some examples, a measurement gap between sampling of the different frequencies for such UE measurements may be long enough to allow the first UE 315-a to perform measurements of at least beacon signals for Wi-Fi transmissions and demodulation reference signals (DRS) for LTE base stations. In some examples, the measurement gap may be set to allow the first UE 315-a to determine a preamble for Wi-Fi transmissions and also a preamble/CUBS for signals from other base stations.

In some examples, the first base station 305-a may use the UE measurement report and the base station measurement report to determine that the first UE 315-a may be handed over to the second base station 305-b, as will be discussed in more detail below. While FIG. 3 illustrates a WLAN AP 310 generating an interfering signal 345-a, such interference may be generated from other nodes in the wireless communications system 300, such as the third base station 305-c, as described below with respect to FIG. 4.

Figure 4:
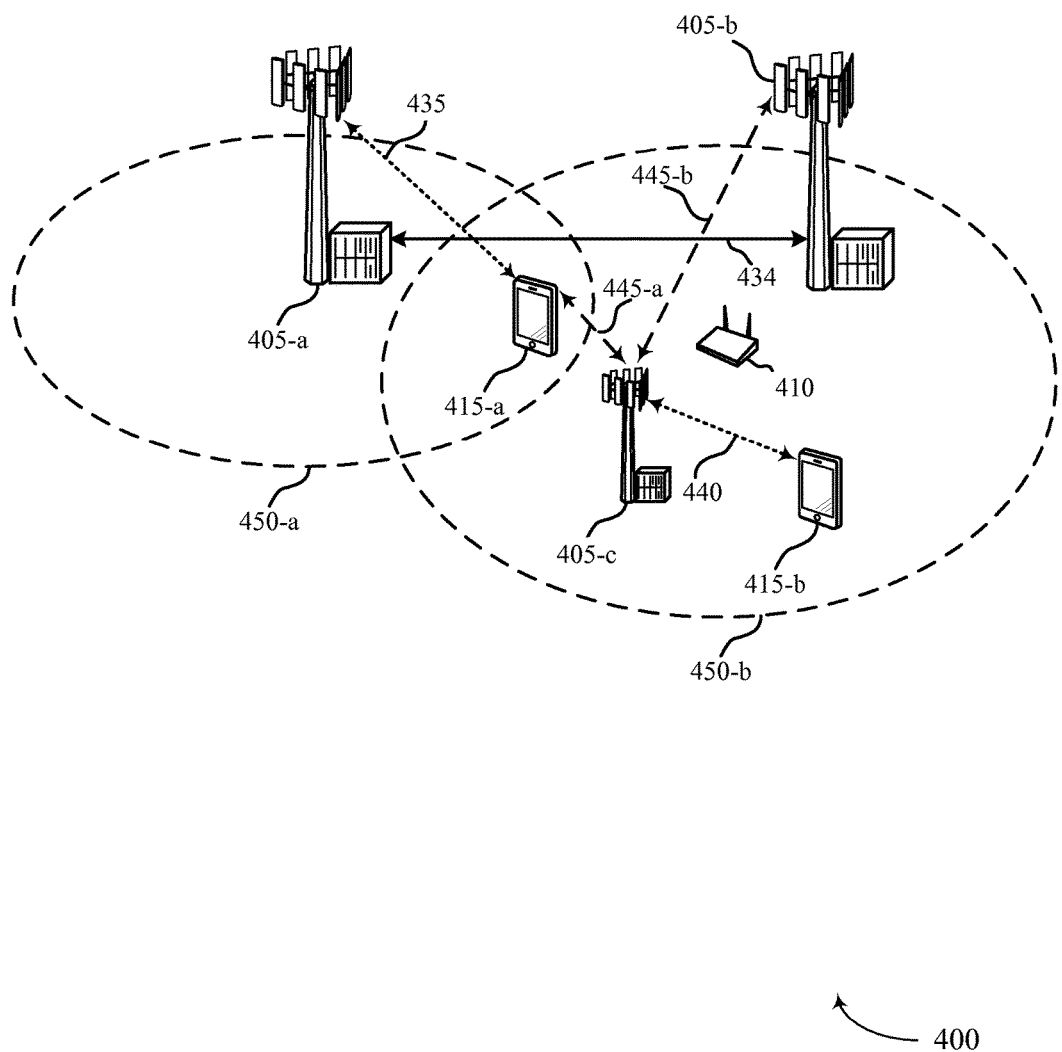
FIG. 4 shows another example of a wireless communication system in which one or more nodes may generate an interfering signal at a UE, in accordance with aspects of the present disclosure.

FIG. 4 shows another example of a wireless communication system 400 in which one or more nodes may generate an interfering signal at a UE, in accordance with various aspects of the present disclosure. The wireless communication system 400 may be an example of portions of the wireless communication system 100, 200, or 300 described with reference to FIG. 1, 2 or 3. Moreover, base stations 405 of FIG. 4 may be examples of aspects of one or more of the base stations 105, 205, or 305 described with reference to FIG. 1, 2, or 3 while UEs 415 of FIG. 4 may be examples of aspects of one or more of the UEs 115, 215, or 315 described with reference to FIG. 1, 2, or 3.

As illustrated in the example of FIG. 4, wireless communication system 400 may include a first base station 405-a that may act as a serving base station to a first UE 415-a, and may communicate with the first UE 415-a through a communication link 435. As discussed above, in some situations first UE 415-a may experience interference in the reception and/or transmission of signals on communication link 435 from one or more interfering signals 445-a that may be received from third base station 405-c. For example, the third base station 405-c may be within an energy detection range or preamble detection (PD) range of the first UE 415-a. The third base station 405-c may transmit signals, in some examples, using the unlicensed radio frequency spectrum band to a second UE 415-b on communication link 440 according to a different deployment than a deployment of the first base station 405-a or second base station 405-b (e.g., deployed by a different public land mobile network (PLMN) operator).

The first base station 405-a may not detect signals from the third base station 405-c because, for example, the third base station 405-c may not be within an energy detection range or PD range 450-a of the first base station 405-a. In some examples, the first base station 405-a and/or third base station 405-c may use time division multiplexing (TDM) for access to the unlicensed radio frequency spectrum band, such that the first base station 405-a receives signals at time intervals that are different from time intervals of transmissions of third base station 405-c. The third base station 405-c may be within an energy detection range or PD range 450-b of the second base station 405-b, or the second base station 405-b may have a TDM configuration that allows for reception of signals 445-b from the third base station 405-c.

For example, the second base station 405-b may detect one or more transmissions of third base station 405-c. The second base station 405-b may determine information related to the third base station 405-c based at least in part on the detected transmissions of third base station 405-c. The second base station 405-b may generate a base station measurement report of one or more nodes (e.g., WLAN AP 410 and/or third base station 405-c) within an energy detection range or preamble detection (PD) range 450-b of the second base station 405-b. The second base station 405-b may include information related to the third base station 405-c in a base station measurement report that may be provided to the first base station 405-a via a backhaul communication link 434 (e.g., an X2 interface such as X2 interface 134 of FIG. 1), similarly as discussed above with respect to FIG. 3. The base station measurement report of the second base station 405-b may also include information related to WLAN AP 410, which may transmit Wi-Fi signals using the unlicensed radio frequency spectrum band, for example. Additionally, according to various examples, the first UE 415-a may generate and transmit a UE measurement report that may indicate that the interfering signal 445-a from the third base station 405-c is causing interference at the first UE 415-a. The UE measurement report may be transmitted to the first base station 405-a via communication link 435, and may include information determined at measurement gaps such as discussed above with respect to FIG. 3. In some examples, the first base station 405-a may use the UE measurement report and the base station measurement report to determine that the first UE 415-a may be handed over to the second base station 405-b, as will be discussed in more detail below.

Figure 5:
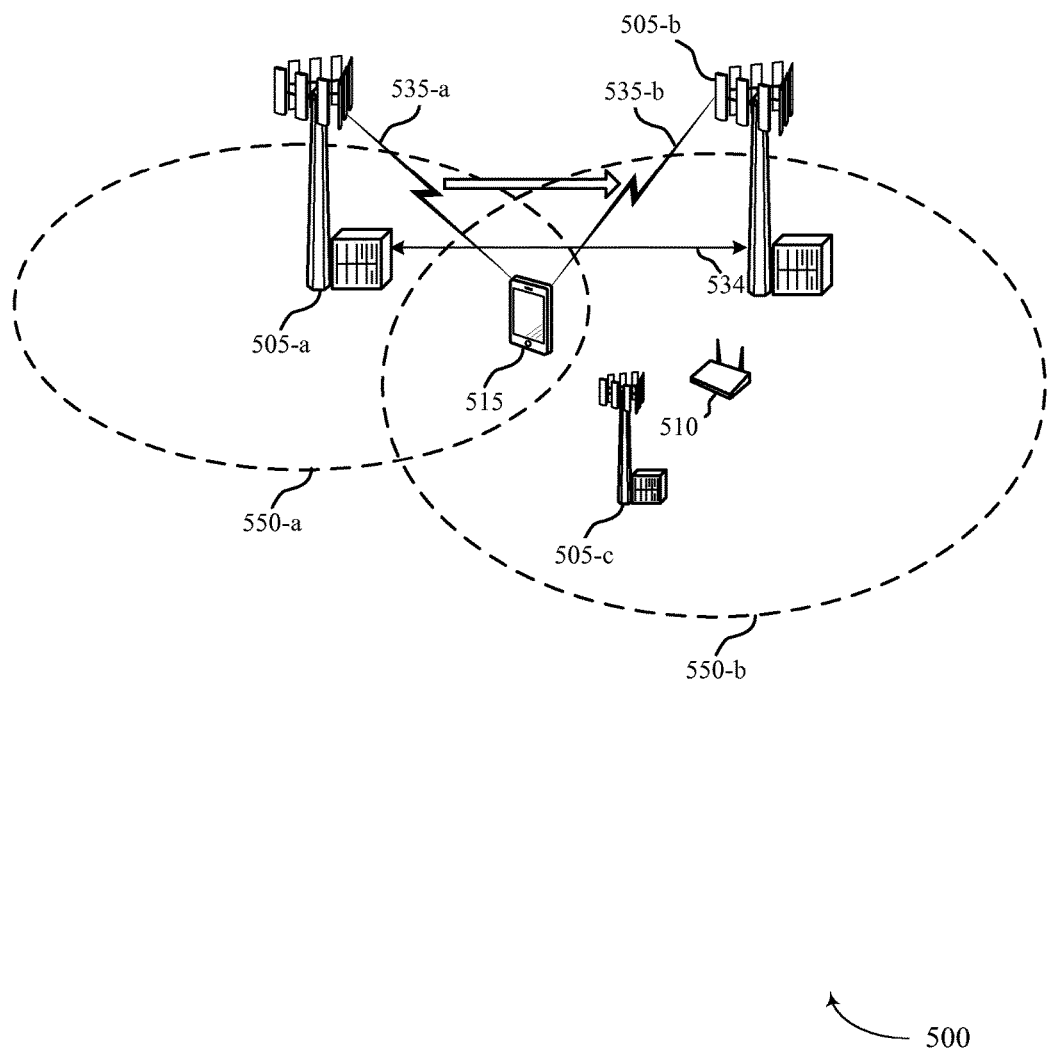
FIG. 5 shows a wireless communication system in which a UE may be handed over to a different base station, in accordance with aspects of the present disclosure.

As discussed above, it may be determined that a UE is to be handed over to a different base station in the event that it is determined that the UE is experiencing interference from one or more nodes operating in a wireless communications system. FIG. 5 shows a wireless communication system 500 in which a UE may be handed over to a different base station, in accordance with various aspects of the present disclosure. The wireless communication system 500 may be an example of portions of the wireless communication system 100, 200, 300, or 400 described with reference to FIG. 1, 2, 3, or 4. Moreover, base stations 505 of FIG. 5 may be examples of aspects of one or more of the base stations 105, 205, 305, or 405 described with reference to FIG. 1, 2, 3, or 4, while UE 515 of FIG. 5 may be an example of aspects of one or more of the UEs 115, 215, 315, or 415 described with reference to FIG. 1, 2, 3, or 4.

In the example of FIG. 5, the first base station 505-a may receive one or more base station measurement reports from second base station 505-b (and/or other base stations not shown), and may receive one or more UE measurement reports from a UE 515 (and/or other UEs not shown). The base station measurement report(s) may be provided via a backhaul link 534 (such as X2 interface 134 of FIG. 1). The UE measurement report(s) may be provided via communications link 525-a. The base station measurement report(s), and the UE measurement report(s) may include information related to, for example, a third base station 505-c and a WLAN AP 510, which may or may not be detectable by the first base station 505-a for reasons similarly as discussed above. In the event that the first base station 505-a determines that the UE 515 is experiencing interference from a hidden node (e.g., interference from signals transmitted by a non-serving third base station 505-c or a non-serving WLAN AP 510, where the non-serving third base station 505-c or a non-serving WLAN AP 510 may not be detectable by the first base station 505-a), the first base station 505-a may determine that the UE 515 is to be handed over to a target base station, such as second base station 505-b.

In some examples, the determination of the target base station may be made, at least in part, based on the base station measurement report(s) and the UE measurement report(s). For example, the target base station may be selected as a base station that is within an energy detection range or preamble detection range (e.g., energy detection range or preamble detection range 550-b of second base station 505-b) of the interfering node (e.g., third base station 505-c or WLAN AP 510). In some examples, the target base station (e.g., second base station 505-b) may be selected as a base station that is within an energy detection range or preamble detection range 550-a of the first base station 505-a. Additionally, in some examples, the target base station may be selected based at least in part on whether a signal strength of the target base station at the UE 515 exceeds a signal strength threshold, and thus provides a signal that is sufficiently strong to provide effective wireless communications.

In some examples, the signal strength of the target base station at the UE 515 may be less than the signal strength of the first base station 505-a. In some examples, the UE 515 may provide preamble detection of the interfering signal to identify interfering node, although in other examples, DRS or beacon signal measurements may be sufficient for the first base station 505-a to identify the interfering node. In further examples, the second base station 505-b (and/or other base stations not shown) may provide loading information to the first base station 505-a, which may be taken into account when making the handover determination. Such loading information may include, for example, channel occupancy of the second base station 505-b.

Figure 6:
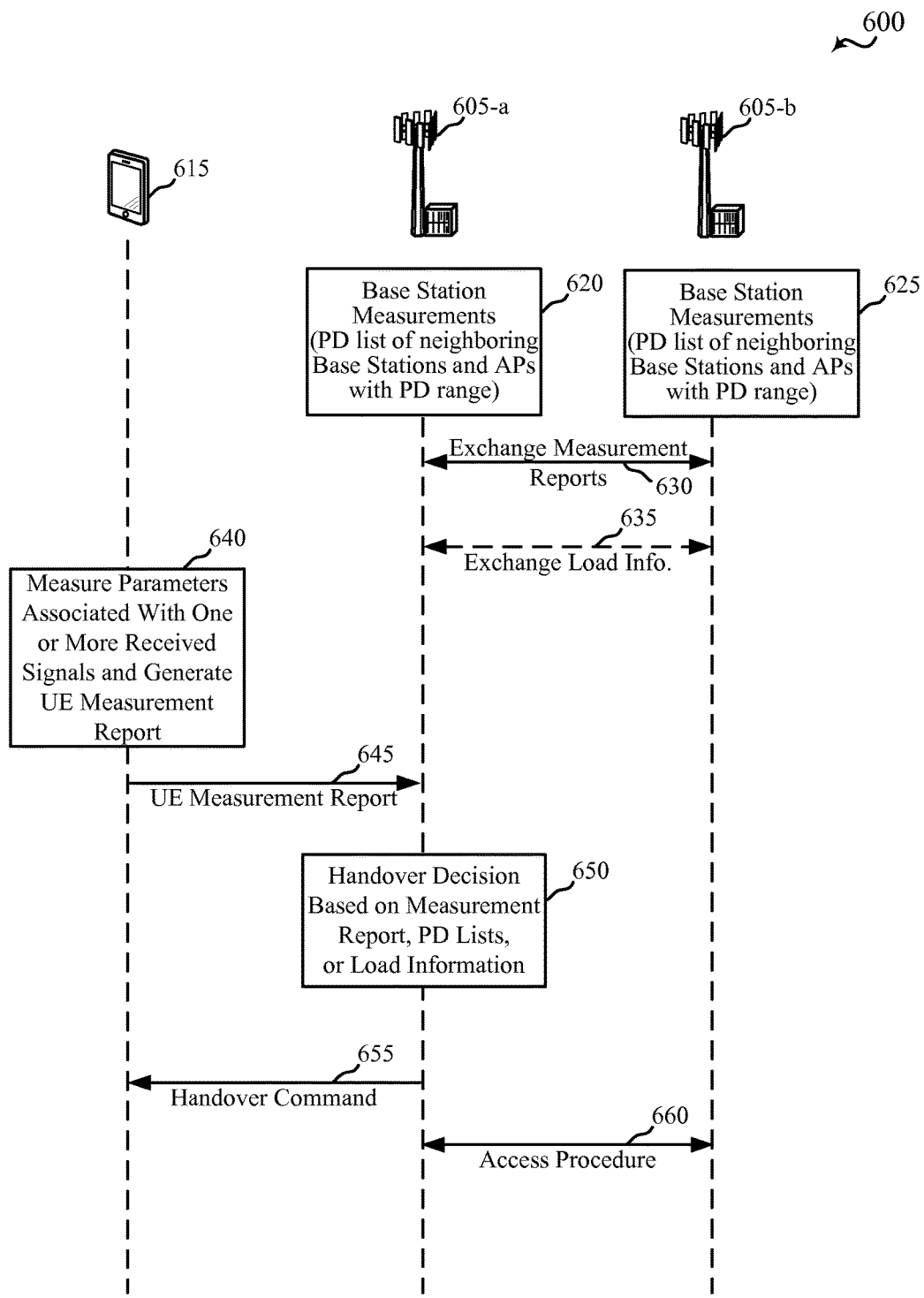
FIG. 6 shows a call flow diagram illustrating operations and communications between network devices in a wireless communication system, in accordance with aspects of the present disclosure.

FIG. 6 shows a call flow diagram 600 illustrating operations and communications between network devices in a wireless communication system, in accordance with various aspects of the present disclosure. The call flow diagram 600 may illustrate aspects of the wireless communications systems 100, 200, 300, 400, or 500 described with reference to FIG. 1, 2, 3, 4, or 5, respectively. The call flow diagram 600 includes a UE 615, a first base station 605-a, and a second base station 605-b. The UE 615 may be an example of one or more of the UEs 115, 215, 315, 415, or 515 described above with respect to FIG. 1, 2, 3, 4, or 5. The base stations 605 may be examples of one or more of the base stations 105, 205, 305, 405, or 505 described above with respect to FIG. 1, 2, 3, 4, or 5. In some examples, the first base station 605-a may be a serving base station of the UE 615, and the second base station 605-b may be a target base station of a handover procedure. The call flow diagram 600 illustrates aspects of implementing handover operations for based on detection of one or more interfering nodes that may transmit interfering communications to UE 615. In some examples, a system device, such as one of the UE 615 or base stations 605 may execute one or more sets of codes to control the functional elements of the device to perform some or all of the functions described below.

At block 620, the first base station 605-a may perform base station measurements and may generate a base station measurement report, which may include a preamble detection (PD) list of neighboring base stations and WLAN APs with a PD range of the first base station 605-a. At block 625, the second base station 605-b may perform base station measurements and may generate a base station measurement report, which may include a PD list of neighboring base stations and WLAN APs with a PD range of the second base station 605-b. The first base station 605-a and second base station 605-b may exchange measurement reports, as indicated at 630, such as via a backhaul link. In some examples, the first base station 605-a and second base station 605-b optionally may exchange load information, as indicated at 635.

At block 640, the UE 615 may measure parameters associated with one or more received signals and generate a UE measurement report. The UE measurement report may be transmitted to the first base station 605-a, as indicated at 645. At block 650, the first base station 605-a may make a handover decision based on the measurement reports, PD lists, or load information (or combination thereof). In the event that the first base station 605-*a* determines to handover the UE 615 to the second base station 605-*b*, a handover command 655 may be transmitted to the UE 615. An access procedure 660 may then be initiated between the first base station 605-*a* and the second base station 605-*b* to perform the handover according to established handover techniques.

Figure 7:
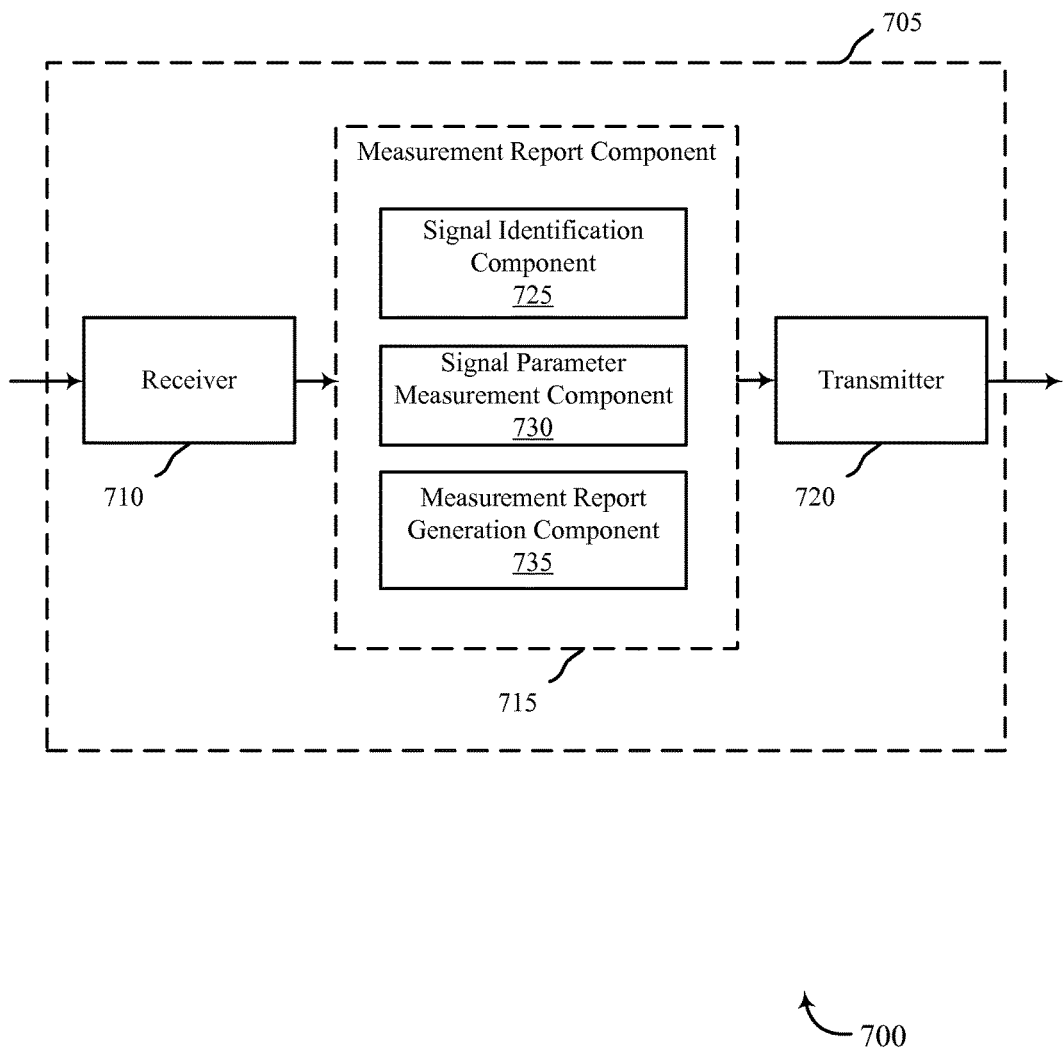
FIG. 7 shows a block diagram of an apparatus configured for use in wireless communication, in accordance with aspects of the present disclosure.

FIG. 7 shows a block diagram 700 of an apparatus 705 configured for use in wireless communication, in accordance with various aspects of the present disclosure. The apparatus 705 may be an example of aspects of one or more of the UEs 115, 215, 315, 415, 515, or 615 described with reference to FIG. 1, 2, 3, 4, 5, or 6. The apparatus 705 may also be or include a processor. The apparatus 705 may include a receiver 710, a measurement report component 715, and a transmitter 720. At least one of these components may be in communication with each other.

The components of the apparatus 705 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver 710 may include at least one radio frequency (RF) receiver, such as at least one RF receiver operable to receive transmissions over a licensed radio frequency spectrum band (e.g., a radio frequency spectrum band for which transmitting apparatuses may not contend for access because the radio frequency spectrum band is licensed to one or more users for some uses, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the unlicensed radio frequency spectrum band may be used for LTE/LTE-A communications, as described, for example, with reference to FIG. 1, 2, 3, 4, 5, or 6. The receiver 710 may be used to receive various types of data or control signals (i.e., transmissions) over one or more communication links of a wireless communication system, such as one or more communication links of the wireless communication system 100, 200, 300, 400, or 500 described with reference to FIG. 1, 2, 3, 4, or 5. The communication links may be established over the licensed radio frequency spectrum band or the unlicensed radio frequency spectrum band.

In some examples, the transmitter 720 may include at least one RF transmitter, such as at least one RF transmitter operable to transmit over the licensed radio frequency spectrum band or the unlicensed radio frequency spectrum band. The transmitter 720 may be used to transmit various types of data or control signals (i.e., transmissions) over one or more communication links of a wireless communication system, such as one or more communication links of the wireless communication system 100, 200, 300, 400, or 500 described with reference to FIG. 1, 2, 3, 4, or 5. The communication links may be established over the licensed radio frequency spectrum band or the unlicensed radio frequency spectrum band. In some examples, the transmitter 720 may be collocated with the receiver 710 in a transceiver.

In some examples, the measurement report component 715 may be used to measure one or more parameters of signals received at the apparatus 705 via receiver 710 and generate a measurement report for transmission by the transmitter 720. The one or more parameters measured by the measurement report component 715 may include, for example, one or more of a signal strength of transmissions of one or more devices that may transmit signals using the licensed radio frequency spectrum band or unlicensed radio frequency spectrum band, an identification of the one or more devices, measurements taken on a plurality of frequencies of the unlicensed radio frequency spectrum band or licensed radio frequency spectrum band that are different from a frequency of a serving base station, or a plurality of measurements taken at time intervals having a duration selected to allow the apparatus 705 to perform measurements of at a least one of a beacon signal for a WLAN AP or a demodulation reference signal (DRS) signal for base station transmissions. The measurement report component 715 also may determine that one or more signals received at the apparatus 705 is causing interference with a signal from a serving base station, and may include an identification of the interfering signal(s) in a measurement report, such as preamble detection information of CUBS information associated with the interfering signal(s), for example.

In some examples, the measurement report component 715 may include a signal identification component 725, a signal parameter measurement component 730, or a measurement report generation component 735. The signal identification component 725 may perform, for example, preamble identification or CUBS identification for one or more signals received using the unlicensed radio frequency spectrum band, in a manner similarly as described above with respect to FIG. 1, 2, 3, 4, or 5. In some examples, the signal parameter measurement component 730 may perform various measurements on received signals, such as, for example, signal strength of the received signals or timing of receipt of the signals, in a manner similarly as described above with respect to FIG. 1, 2, 3, 4, or 5. In some examples, the measurement report generation component 735 may generate one or more measurement reports that may be provided to, for example, a serving base station, in a manner similarly as described above with respect to FIG. 1, 2, 3, 4, or 5.

Figure 8:
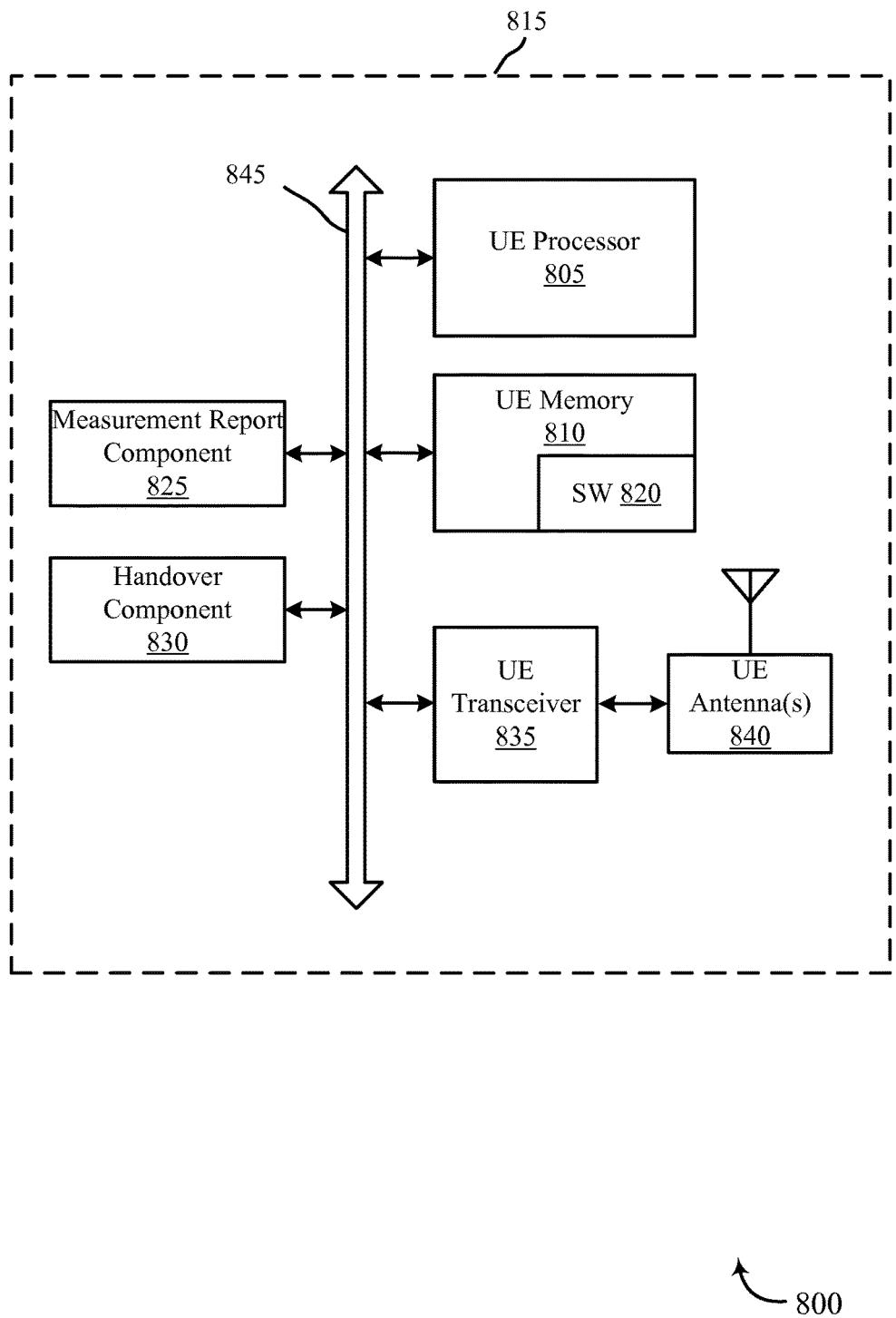
FIG. 8 shows a block diagram of a UE for use in wireless communication, in accordance with aspects of the present disclosure.

FIG. 8 shows a block diagram 800 of a UE 815 for use in wireless communication, in accordance with various aspects of the present disclosure. The UE 815 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 815 may, in some examples, have an internal power supply (not shown), such as a small battery, to facilitate mobile operation. In some examples, the UE 815 may be an example of aspects of one or more of the UE 115, 215, 315, 415, 515, or 615 described with reference to FIG. 1, 2, 3, 4, 5, or 6, or aspects of the apparatus 705 described with reference to FIG. 7. The UE 815 may be configured to implement at least some of the UE or apparatus features and functions described with reference to FIG. 1, 2, 3, 4, 5, 6, or 7.

The UE 815 may include a UE processor 805, a UE memory 810, at least one transceiver (represented by UE transceiver 835), at least one antenna (represented by UE antennas 840), a measurement report component 825, or a handover component 830. At least one of these components may be in communication with each other, directly or indirectly, over one or more buses 845.

The UE memory 810 may include random access memory (RAM) or read-only memory (ROM). The UE memory 810 may store computer-readable, computer-executable code 820 containing instructions that are configured to, when executed, cause the UE processor 805 to perform various functions described herein related to wireless communication, including the performance of parameter measurement, UE measurement report generation, and handover operations. Alternatively, the code 820 may not be directly executable by the UE processor 805 but be configured to cause the UE 815 (e.g., when compiled and executed) to perform various aspects of the functions described herein.

The UE processor 805 may include an intelligent hardware device, e.g., a central processing unit (CPU), a microcontroller, an ASIC, etc. The UE processor 805 may process information received through the UE transceiver 835 or information to be sent to the UE transceiver 835 for transmission through the UE antennas 840. The UE processor 805 may handle, alone or in connection with the measurement report component 825 and handover component 830, various aspects of communicating over a licensed radio frequency spectrum band or an unlicensed radio frequency spectrum band, including handovers to different base stations based on one or more interfering signals received at the UE 815.

The UE transceiver 835 may include a modem configured to modulate packets and provide the modulated packets to the UE antennas 840 for transmission, and to demodulate packets received from the UE antennas 840. The UE transceiver 835 may, in some examples, be implemented as one or more transmitters and one or more separate receivers. The UE transceiver 835 may support communications in the licensed radio frequency spectrum band or the unlicensed radio frequency spectrum band. The UE transceiver 835 may be configured to communicate bi-directionally, via the UE antennas 840, with one or more of the base stations 105, 205, 305, 405, 505 or 605 described with reference to FIG. 1, 2, 3, 4, 5, or 6. While the UE 815 may include a single UE antenna, there may be examples in which the UE 815 may include multiple UE antennas 840.

The handover component 830 may be used, for example, to manage transitions of the UE 815 between a serving base station and a target base station, and may be in communication with other components of the UE 815, directly or indirectly, over the one or more buses 845. The handover component 830, or portions of it, may include a processor, or some or all of the functions of the handover component 830 may be performed by the UE processor 805 or in connection with the UE processor 805.

The measurement report component 825 may be configured to perform or control some or all of the UE or apparatus features or functions described with reference to FIG. 1, 2, 3, 4, 5, 6, or 7 related to wireless communication over a licensed radio frequency spectrum band or an unlicensed radio frequency spectrum band. For example, the measurement report component 825 may be configured to perform parameter measurements and generate UE measurement reports for transmission to a serving base station for use in determining if the UE 815 should be handed over to a different base station. The measurement report component 825, or portions of it, may include a processor, or some or all of the functions of the measurement report component 825 may be performed by the UE processor 805 or in connection with the UE processor 805. In some examples, the measurement report component 825 may be an example of the measurement report component 715 described with reference to FIG. 7.

Figure 9:
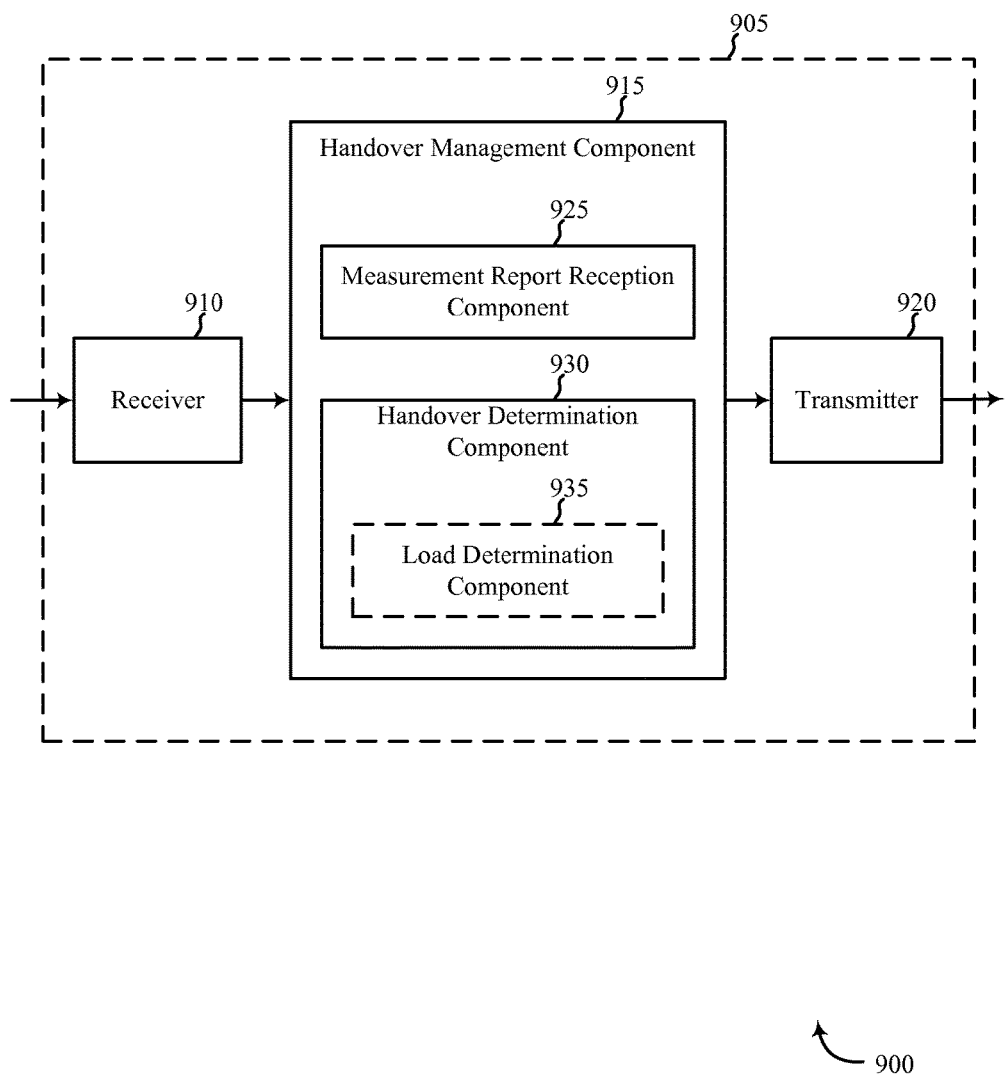
FIG. 9 shows a block diagram of an apparatus for use in wireless communication, in accordance with aspects of the present disclosure.

FIG. 9 shows a block diagram 900 of an apparatus 905 for use in wireless communication, in accordance with various aspects of the present disclosure. In some examples, the apparatus 905 may be an example of aspects of one or more of the base stations 105, 205, 305, 405, 505, or 605 described with reference to FIG. 1, 2, 3, 4, 5, or 6. In some examples, the apparatus 905 may be part or include an LTE/LTE-A eNB and/or an LTE/LTE-A base station. The apparatus 905 may also be a processor. The apparatus 905 may include a receiver 910, a handover management component 915, and a transmitter 920. At least one of these components may be in communication with each other.

The components of the apparatus 905 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver 910 may include at least one radio frequency (RF) receiver, such as an RF receiver operable to receive RF signals using a licensed radio frequency spectrum band or an unlicensed radio frequency spectrum band from one or more UEs. The receiver 910 may be used to receive various types of data and/or control signals (i.e., transmissions) over one or more communication links of a wireless communication system, such as one or more communication links of the wireless communications systems 100, 200, 300, 400, or 500 described with reference to FIG. 1, 2, 3, 4, or 5.

In some examples, the transmitter 920 may include at least one RF transmitter, such as at least one RF transmitter operable to transmit signals using a licensed radio frequency spectrum band or an unlicensed radio frequency spectrum band, in a manner similarly as discussed above with respect to FIG. 1, 2, 3, 4, 5, or 6. The transmitter 920 may be used to transmit various types of data and/or control signals (i.e., transmissions) over one or more communication links of a wireless communication system, such as one or more communication links of the wireless communications systems 100, 200, 300, 400, or 500 described with reference to FIG. 1, 2, 3, 4, or 5. In some examples, the handover management component 915 may perform handover management operations and determinations such as discussed above with respect to FIG. 1, 2, 3, 4, 5, or 6.

In the example of FIG. 9, the handover management component 915 may include a measurement report reception component 925, and a handover determination component 930 having an optional load determination component 935. The measurement report reception component 925, in some examples, may receive one or more of a base station measurement report from one or more different base stations of a UE measurement report from one or more different UEs. The measurement reports may include measurement reports such as described with respect to FIG. 1, 2, 3, 4, 5, or 6, and may include, for example, information related to one or more transmitting devices that may be transmitting interfering signals at a UE. The handover determination component 930, in some examples, may make determinations related to handover of a UE to a target base station. Such determinations may be made according to techniques such as discussed above with respect to FIG. 1, 2, 3, 4, 5, or 6, and may be based on, for example, channel conditions, loading at the base station, loading at other base stations, capabilities of base stations, presence of interfering signals at a UE, etc. The handover determination component 930 may include a load determination component 935 that may receive a load parameter from one or more other base stations, that may be used in a determination of whether to handover a UE and to which base station a UE may be handed over, such as discussed above with respect to FIG. 1, 2, 3, 4, 5, or 6.

Figure 10:
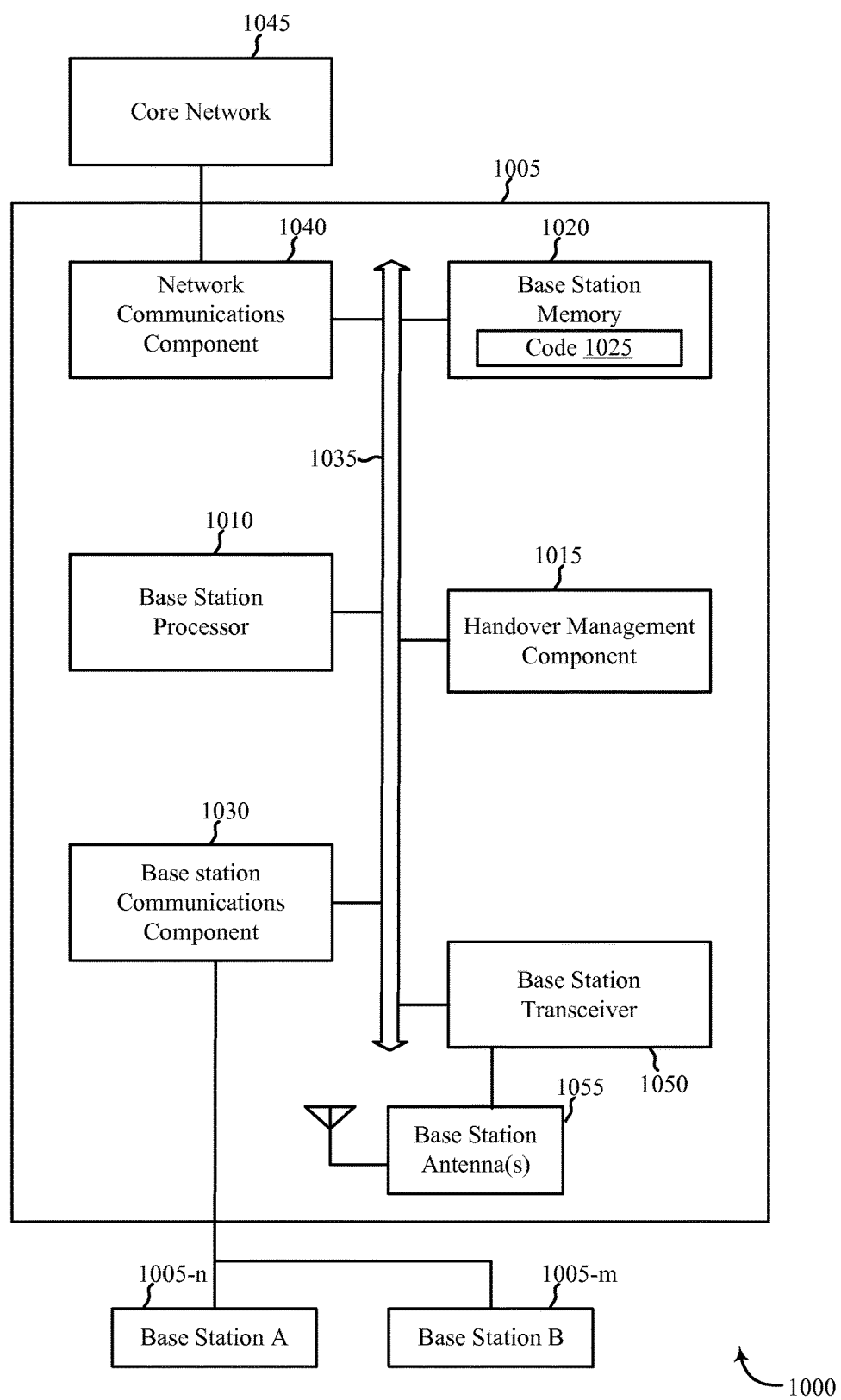
FIG. 10 shows a block diagram of a base station (e.g., a base station forming part or all of an eNB) for use in wireless communication, in accordance with aspects of the present disclosure.

FIG. 10 shows a block diagram 1000 of a base station 1005 (e.g., a base station forming part or all of an eNB) for use in wireless communication, in accordance with various aspects of the present disclosure. In some examples, the base station 1005 may be an example of aspects of one or more of the base stations 105, 205, 305, 405, 505, or 605 described with reference to FIG. 1, 2, 3, 4 5, or 6, and/or aspects of one or more of the apparatus 1005 or 1105 when configured as a base station, as described with reference to FIG. 10 or 11. The base station 1005 may be configured to implement or facilitate at least some of the base station and/or apparatus features and functions described with reference to one or more of FIG. 1, 2, 3, 4, 5, 6, or 9.

The base station 1005 may include a base station processor 1010, a base station memory 1020, at least one base station transceiver (represented by base station transceiver 1050), at least one base station antenna (represented by base station antenna(s) 1055), and/or a handover management component 1015. The base station 1005 may also include one or more of a base station communications component 1030 and/or a network communications component 1040. At least one of these components may be in communication with each other, directly or indirectly, over one or more buses 1035.

The base station memory 1020 may include random access memory (RAM) and/or read-only memory (ROM). The base station memory 1020 may store computer-readable, computer-executable software/firmware code 1025 containing instructions that are configured to, when executed, cause the base station processor 1010 to perform various functions described herein related to wireless communication (e.g., handover determination operations, etc.). Alternatively, the computer-readable, computer-executable software/firmware code 1025 may not be directly executable by the base station processor 1010 but be configured to cause the base station 1005 (e.g., when compiled and executed) to perform various of the functions described herein.

The base station processor 1010 may include an intelligent hardware device, e.g., a central processing unit (CPU), a microcontroller, an ASIC, etc. The base station processor 1010 may process information received through the base station transceiver 1050, the base station communications component 1030, and/or the network communications component 1040. The base station processor 1010 may also process information to be sent to the base station transceiver 1050 for transmission through the antenna(s) 1055, to the base station communications component 1030, for transmission to one or more other base stations 1005-*n* and 1005-*m*, and/or to the network communications component 1040 for transmission to a core network 1045, which may be an example of one or more aspects of the core network 130 described with reference to FIG. 1. The base station processor 1010 may handle, alone or in connection with the handover management component 1015, various aspects of handover techniques as discussed above with respect to FIG. 1, 2, 3, 4, 5, 6, or 9.

The base station transceiver 1050 may include a modem configured to modulate packets and provide the modulated packets to the base station antenna(s) 1055 for transmission, and to demodulate packets received from the base station antenna(s) 1055. The base station transceiver 1050 may, in some examples, be implemented as one or more base station transmitters and one or more separate base station receivers. The base station transceiver 1050 may support communications in a licensed radio frequency spectrum band or an unlicensed radio frequency spectrum band. The base station transceiver 1050 may be configured to communicate bi-directionally, via the base station antenna(s) 1055, with one or more UEs or apparatuses, such as one or more of the UEs 115, 215, 315, 415, 515, 615 or 915 described with reference to FIG. 1, 2, 3, 4, 5, 6, or 9 or apparatuses 705 or 805 described with reference to FIG. 7 or 8. The base station 1005 may, for example, include multiple base station antenna(s) 1055 (e.g., an antenna array). The base station 1005 may communicate with the core network 1045 through the network communications component 1040. The base station 1005 may also communicate with other base stations, such as the base stations 1005-*n* and 1005-*m*, using the base station communications component 1030.

The handover management component 1015 may be configured to perform and/or control some or all of the features and/or functions described with reference to FIG. 1, 2, 3, 4, 5, or 6 related to determination of the presence of interfering signals and handover of a UE. The handover management component 1015, or portions of the handover management component 1015, may include a processor, and/or some or all of the functions of the handover management component 1015 may be performed by the base station processor 1010 and/or in connection with the base station processor 1010. In some examples, the handover management component 1015 may be an example of the handover management component 915 described with reference to FIG. 9.

Figure 11:
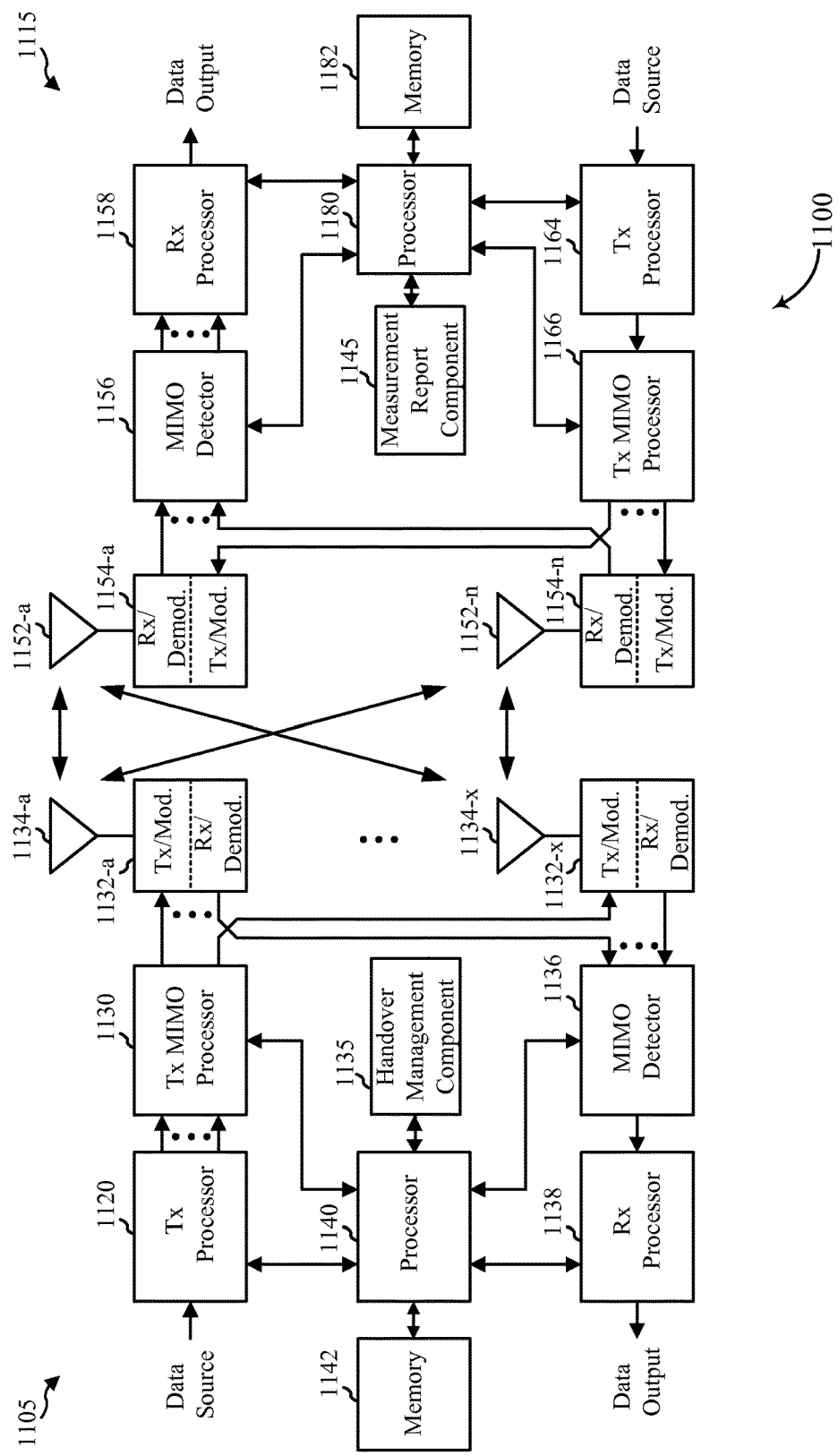
FIG. 11 shows a block diagram of a multiple input/multiple output (MIMO) communications system including a base station and a UE, in accordance with aspects of the present disclosure.

FIG. 11 shows a block diagram of a multiple input/multiple output (MIMO) communications system 1100 including a base station 1105 and a UE 1115, in accordance with various aspects of the present disclosure. The MIMO communications system 1100 may illustrate aspects of the wireless communications systems 100, 200, 300, 400, or 500 shown in FIG. 1, 2, 3, 4, or 5. The base station 1105 may be equipped with base station antennas 1134-*a* through 1134-*x*, and the UE 1115 may be equipped with UE antennas 1152-*a* through 1152-*n*. In the MIMO communications system 1100, the base station 1105 may be able to send data over multiple communication links at the same time. Each communication link may be called a "layer" and the "rank" of the communication link may indicate the number of layers used for communication. For example, in a 2×2 MIMO communications system where base station 1105 transmits two "layers," the rank of the communication link between the base station 1105 and the UE 1115 is two.

At the base station 1105, a transmit processor 1120 may receive data from a data source. The transmit processor 1120 may process the data. The transmit processor 1120 may also generate control symbols and/or reference symbols. A transmit (TX) MIMO processor 1130 may perform spatial processing (e.g., precoding) on data symbols, control symbols, and/or reference symbols, if applicable, and may provide output symbol streams to the base station modulators/demodulators 1132-*a* through 1132-*x*. Each base station modulator/demodulator 1132 may process a respective output symbol stream (e.g., for OFDM, etc.) to obtain an output sample stream. Each base station modulator/demodulator 1132 may further process (e.g., convert to analog, amplify, filter, and upconvert) the output sample stream to obtain a DL signal. In one example, DL signals from base station modulator/demodulators 1132-*a* through 1132-*x* may be transmitted via the base station antennas 1134-*a* through 1134-*x*, respectively.

At the UE 1115, the UE antennas 1152-*a* through 1152-*n* may receive the DL signals from the base station 1105 and may provide the received signals to the UE demodulators/modulators 1154-*a* through 1154-*n*, respectively. Each UE demodulator/modulator 1154 may condition (e.g., filter, amplify, downconvert, and digitize) a respective received signal to obtain input samples. Each UE demodulator/modulator 1154 may further process the input samples (e.g., for OFDM, etc.) to obtain received symbols. A MIMO detector 1156 may obtain received symbols from all the UE demodulators/modulators 1154-*a* through 1154-*n*, perform MIMO detection on the received symbols, if applicable, and provide detected symbols. A receive processor 1158 may process (e.g., demodulate, deinterleave, and decode) the detected symbols, providing decoded data for the UE 1115 to a data output, and provide decoded control information to a processor 1180, or memory 1182.

The processor 1180 may in some cases execute stored instructions to instantiate one or more of a measurement report component 1145. The measurement report component 1145 may be an example of aspects of the measurement report component 715 or 825 described with reference to FIG. 7 or 8.

On the uplink (UL), at the UE 1115, a transmit processor 1164 may receive and process data from a data source. The transmit processor 1164 may also generate reference symbols for a reference signal. The symbols from the transmit processor 1164 may be precoded by a transmit MIMO processor 1166 if applicable, further processed by the UE demodulators/modulators 1154-*a* through 1154-*n* (e.g., for SC-FDMA, etc.), and be transmitted to the base station 1105 in accordance with the transmission parameters received from the base station 1105. At the base station 1105, the UL signals from the UE 1115 may be received by the base station antennas 1134, processed by the base station modulators/demodulators 1132, detected by a MIMO detector 1136 if applicable, and further processed by a receive processor 1138. The receive processor 1138 may provide decoded data to a data output and to the processor 1140 and/or memory 1142. The processor 1140 may in some cases execute stored instructions to instantiate one or more of a handover management component 1135. The handover management component 1135 may be an example of aspects of the handover management component 915 or 1015 described with reference to FIG. 9 or 10.

The components of the UE 1115 may, individually or collectively, be implemented with one or more ASICs adapted to perform some or all of the applicable functions in hardware. At least one of the noted components may be a means for performing one or more functions related to operation of the MIMO communications system 1100. Similarly, the components of the base station 1105 may, individually or collectively, be implemented with one or more ASICs adapted to perform some or all of the applicable functions in hardware. At least one of the noted components may be a means for performing one or more functions related to operation of the MIMO communications system 1100.

Figure 12:
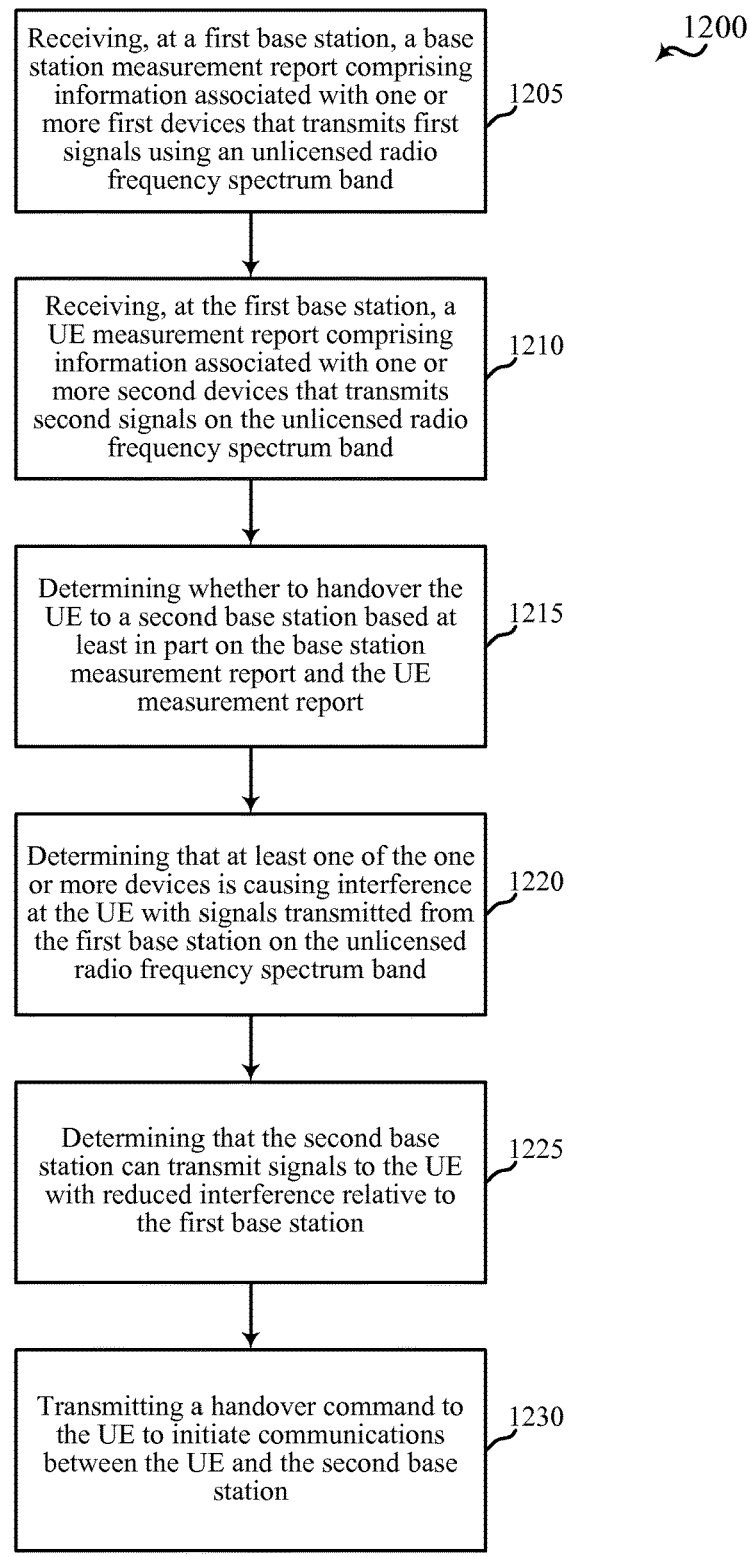
FIG. 12 is a flow chart illustrating an example of a method for wireless communication, in accordance with aspects of the present disclosure.

FIG. 12 is a flow chart illustrating an example of a method 1200 for wireless communication, in accordance with various aspects of the present disclosure. For clarity, the method 1200 is described below with reference to aspects of one or more of the base stations 105, 205, 305, 405, 505, 605, 1005, or 1105 described with reference to FIG. 1, 2, 3, 4, 5, 6, 10, or 11, and/or aspects of one or more of the apparatus 905 described with reference to FIG. 9. In some examples, a base station may execute one or more sets of codes to control the functional elements of the base station to perform the functions described below. Additionally or alternatively, the base station may perform one or more of the functions described below using special-purpose hardware.

At block 1205, the method 1200 may include receiving, at a first base station, a base station measurement report comprising information associated with one or more first devices that transmits first signals using an unlicensed radio frequency spectrum band. The one or more first devices may include, for example, more of a non-serving base station or a non-serving WLAN AP. In some examples, one or more of the first devices may transmit an interfering signal that may interfere with signal reception of a UE. In some examples, the one or more first devices may be within an energy detection range of a base station that provided the base station measurement report, and may be out of an energy detection range of the first base station. In some examples, the base station measurement report may include an identification and an energy measurement of at least one of a non-serving base station or a non-serving WLAN AP. The base station measurement report also may include, in some examples, preamble detection information for at least one of the non-serving base station or the non-serving WLAN AP. The base station measurement report may be received via a backhaul link, for example.

The operation(s) at block 1205 may be performed using the handover management component 915 or 1015 described with reference to FIG. 9 or 10, measurement report reception component 925 of FIG. 9, receiver 910 described with reference to FIG. 9, using the base station transceiver 1050 and base station antenna(s) 1055 of FIG. 10, and/or using the base station antennas 1134 and base station modulators/demodulators 1132 of FIG. 11.

At block 1210, the method 1200 may include receiving, at the first base station, a UE measurement report comprising information associated with one or more second devices that transmits second signals on the unlicensed radio frequency spectrum band. The one or more second devices may include, for example, one or more of a non-serving base station or a non-serving WLAN AP. In some examples, the one or more second devices may be within an energy detection range of the UE. The UE measurement report may include an energy measurement associated with one or more of the second signals received at the UE from at least one of the one or more second devices, in some examples. In some examples, the UE measurement report may include a plurality of measurements taken on a plurality of frequencies of the unlicensed radio frequency spectrum band that are different from a frequency of the first base station. In some examples, the UE measurement report may include a plurality of measurements taken at time intervals having a duration selected to allow the UE to perform measurements of at a least one of a beacon signal for WLAN AP transmissions or a demodulation reference signal for other base station transmissions.

The operation(s) at block 1210 may be performed using the handover management component 915 or 1015 described with reference to FIG. 9 or 10, measurement report reception component 925 of FIG. 9, receiver 910 described with reference to FIG. 9, using the base station transceiver 1050 and base station antenna(s) 1055 of FIG. 10, and/or using the base station antennas 1134 and base station modulators/demodulators 1132 of FIG. 11.

At block 1215, the method 1200 may include determining whether to handover the UE to a second base station based at least in part on the base station measurement report and the UE measurement report. In some examples, the determination may be made that at least one of the one or more devices is causing interference at the UE with signals transmitted from the first base station on the unlicensed radio frequency spectrum band, and that the second base station can transmit signals to the UE with reduced interference relative to the first base station. The determination may include, in some examples, that a signal strength of transmissions of the second base station at the UE exceeds a threshold value, that the second base station is within an energy detection range of the at least one of the one or more devices that is causing interference at the UE, or that the second base station is within an energy detection range of the first base station. In some examples, it may be determined that a signal strength of the first base station at the UE exceeds a signal strength of the second base station at the UE. In some examples, the determination of a handover may also be based at least in part on a loading metric associated with the second base station, which may include, for example, channel occupancy information associated with the second base station.

The operation(s) at block 1215 may be performed using performed using the handover management component 915 or 1015 described with reference to FIG. 9 or 10, the handover determination component 930 or load determination component 935 of FIG. 9, and/or the handover management component 1135 of FIG. 11, for example.

At block 1220, the method 1200 may include, in some examples, determining that at least one of the one or more devices is causing interference at the UE with signals transmitted from the first base station on the unlicensed radio frequency spectrum band. The determination may be based on, for example, one or more UE or base station measurement reports. The operation(s) at block 1220 may be performed using the handover management component 915 or 1015 described with reference to FIG. 9 or 10, the handover determination component 930 or measurement report reception component 925 of FIG. 9, and/or the handover management component 1135 of FIG. 11, for example.

At block 1225, the method 1200 may include, in some examples, determining that the second base station can transmit signals to the UE with reduced interference relative to the first base station. The determination may be based on, for example, one or more UE or base station measurement reports. The operation(s) at block 1225 may be performed using the handover management component 915 or 1015 described with reference to FIG. 9 or 10, the handover determination component 930 or measurement report reception component 925 of FIG. 9, and/or the handover management component 1135 of FIG. 11, for example.

At block 1230, the method 1200 may include, in some examples, transmitting a handover command to the UE to initiate communications between the UE and the second base station. The handover command may include instructions that the UE is to begin communications with the second base station, and information required to complete such a handover. One or more communications with the second base station may also be initiated, to prepare the second base station for handover of the UE, according to some examples. The operation(s) at block 1230 may be performed using the handover management component 915 or 1015 described with reference to FIG. 9 or 10, the handover determination component 930, the transmitter 920 of FIG. 9, the handover management component 1135 of FIG. 11, the base station transceiver 1050 and base station antenna(s) 1055 of FIG. 10, and/or using the base station antennas 1134 and base station modulators/demodulators 1132 of FIG. 11, for example.

Thus, the method 1200 may provide for wireless communication. It should be noted that the method 1200 is just one implementation and that the operations of the method 1200 may be rearranged or otherwise modified such that other implementations are possible.

Figure 13:
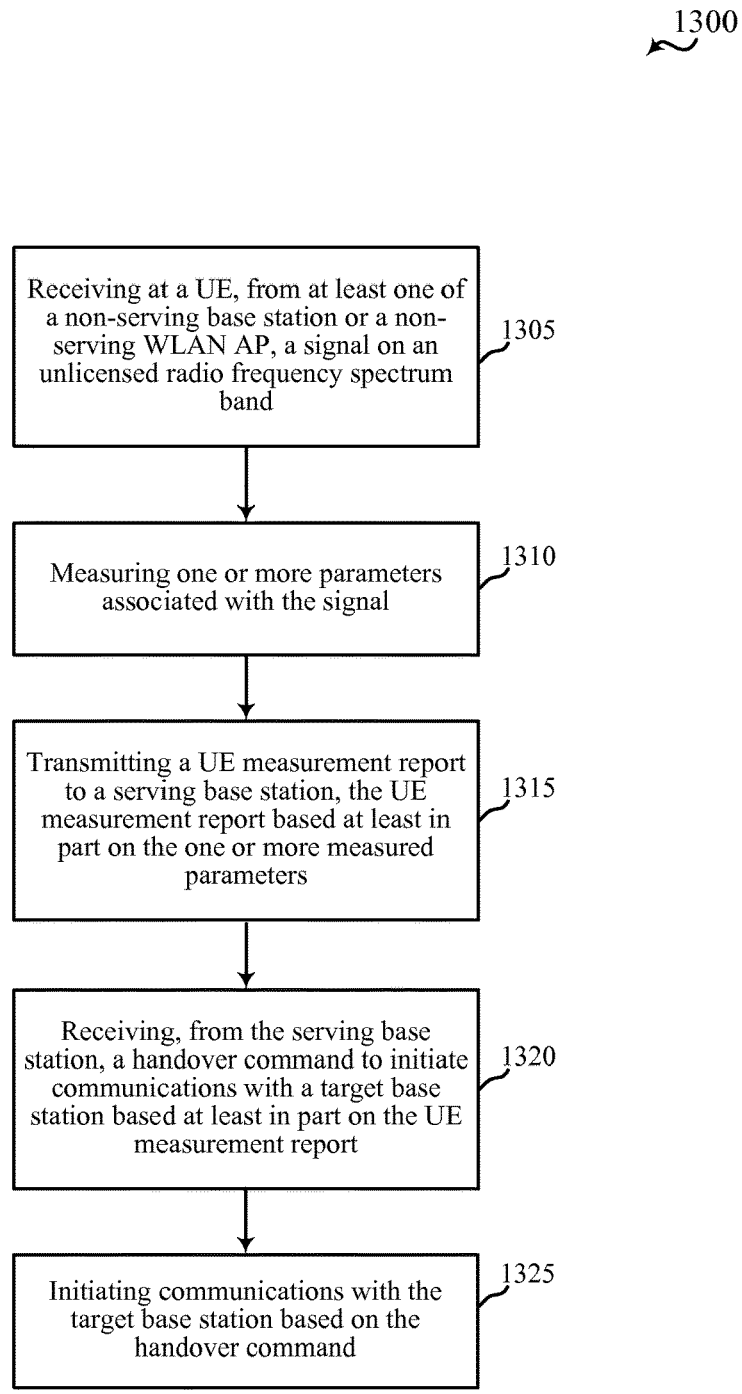
FIG. 13 is a flow chart illustrating an example of another method for wireless communication, in accordance with aspects of the present disclosure.

FIG. 13 is a flow chart illustrating an example of a method 1300 for wireless communication, in accordance with various aspects of the present disclosure. For clarity, the method 1300 is described below with reference to aspects of one or more of the UEs 115, 215, 315, 415, 515, 615, 815, or 1115 described with reference to FIG. 1, 2, 3, 4, 5, 6, 8, or 11, and/or aspects of the apparatus 705 described with reference to FIG. 7. In some examples, a UE may execute one or more sets of codes to control the functional elements of the UE to perform the functions described below. Additionally or alternatively, the UE may perform one or more of the functions described below using special-purpose hardware.

At block 1305, the method 1300 may include receiving at a UE, from at least one of a non-serving base station or a non-serving WLAN AP, a signal on an unlicensed radio frequency spectrum band. The operation(s) at block 1305 may be performed using the receiver 710 described with reference to FIG. 7, using the UE transceiver 835 and UE antennas 840 of FIG. 8, and/or using the UE antennas 1152 and UE modulators/demodulators 1154 of FIG. 11.

At block 1310, the method 1300 may include measuring one or more parameters associated with the signal. The measuring may include, for example, measuring a received signal strength associated with the signal, preamble detection on the signal, or CUBS identification on the signal, for example. In some examples, the UE may take a plurality of measurements on a plurality of frequencies of the unlicensed radio frequency spectrum band that are different than a frequency of the first base station. In some examples, the UE may take a plurality of measurements at time intervals having a duration selected to allow the UE to perform measurements of at a least one of a beacon signal for a WLAN AP or a demodulation reference signal for the non-serving base station. The operation(s) at block 1310 may be performed using the measurement report component 715 described with reference to FIG. 7, using the signal identification component 725 or signal parameter measurement component 730 of FIG. 7, using the measurement report component 825 of FIG. 8, and/or using the measurement report component 1145 of FIG. 11.

At block 1315, the method 1300 may include transmitting a UE measurement report to a serving base station, the UE measurement report based at least in part on the one or more measured parameters. The UE measurement report may include, for example, one or more of preamble detection information associated with the signal, information associated with a second base station from a same deployment as the first base station, a third base station from a different deployment as the first base station, or information associated with one or more WLAN APs that are undetectable by the first base station.

The operation(s) at block 1315 may be performed using the transmitter 720 described with reference to FIG. 7, using the measurement report components 715 or 825 described with reference to FIG. 7 or 8, using the measurement report generation component 735 of FIG. 7, using the measurement report component 1145 of FIG. 11, using the UE transceiver 835 and UE antennas 840 of FIG. 8, and/or using the UE antennas 1152 UE and UE modulators/demodulators 1154 of FIG. 11.

At block 1320, the method 1300 may include receiving, from the serving base station, a handover command to initiate communications with a target base station based at least in part on the UE measurement report. The operation(s) at block 1320 may be performed using the handover component 830 described with reference to FIG. 8, using the receiver 710 described with reference to FIG. 7, using the UE transceiver 835 and UE antennas 840 of FIG. 8, and/or using the UE antennas 1152 and UE modulators/demodulators 1154 of FIG. 11.

At block 1325, the method 1300 may include initiating communications with the target base station based on the handover command. The operation(s) at block 1325 may be performed using the transmitter 720 described with reference to FIG. 7, using the UE transceiver 835 and UE antennas 840 of FIG. 8, and/or using the UE antennas 1152 and UE modulators/demodulators 1154 of FIG. 11.

Thus, the method 1300 may provide for wireless communication. It should be noted that the method 1300 is just one implementation and that the operations of the method 1300 may be rearranged or otherwise modified such that other implementations are possible.

In some examples, aspects from the methods 1200, and 1300 may be combined. It should be noted that the methods 1200 and 1300 are just example implementations, and that the operations of the methods 1200 and 1300 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communications comprising:
   receiving, at a first base station, a plurality of base station measurement reports, each of the plurality of base station measurement reports received from one of a plurality of base stations, the plurality of base station measurement reports including information associated with one or more first devices that transmits first signals using an unlicensed radio frequency spectrum band, and the one or more first devices different from the plurality of base stations;
   receiving, at the first base station, a user equipment (UE) measurement report from a UE, the UE measurement report including information associated with one or more second devices that transmits second signals using the unlicensed radio frequency spectrum band, and the one or more second devices different from the UE;
   determining, at the first base station, that the one or more first devices or the one or more second devices are outside of an energy detection range of the first base station based at least in part on the plurality of base station measurement reports and the UE measurement report;
   determining, at the first base station, to handover the UE based at least in part on the determination that the one or more first devices or the one or more second devices are outside of the energy detection range of the first base station;
   selecting, at the first base station, a target base station from among the plurality of base stations, wherein the selecting is based at least in part on the one or more first devices or the one or more second devices that are outside the energy detection range of the first base station being within a second energy detection range of the target base station; and
   transmitting, from the first base station, a handover command based at least in part on the determination to handover the UE to the target base station.

2. The method of claim 1, wherein the one or more first devices comprise one or more of a non-serving base station or a non-serving wireless local area network (WLAN) access point (AP).

3. The method of claim 1, wherein the one or more second devices comprise one or more of a non-serving base station or a non-serving wireless local area network (WLAN) access point (AP).

4. The method of claim 1, wherein the one or more first devices are within an energy detection range of the one base station of the plurality of base stations that provided a base station measurement report of the plurality of base station measurement reports.

5. The method of claim 1, wherein the one or more second devices are within an energy detection range of the UE.

6. The method of claim 1, further comprising:
   receiving signals at time intervals that are different from time intervals of transmissions of at least one of the one or more first devices or the one or more second devices.

7. The method of claim 1, wherein the determining to handover the UE comprises:
   determining that at least one of the one or more first devices or the one or more second devices is causing interference at the UE with signals transmitted from the first base station on the unlicensed radio frequency spectrum band; and
   the method further comprising determining that the target base station can transmit signals to the UE with reduced interference relative to the first base station.

8. The method of claim 7, wherein the determining to handover the UE further comprises one or more of:
   determining that a signal strength of transmissions of the target base station at the UE exceeds a threshold value;
   determining that the target base station is within an energy detection range of the at least one of the one or more first devices or the one or more second devices that is causing the interference at the UE;
   or determining that the target base station is within an energy detection range of the first base station.

9. The method of claim 7, wherein a signal strength of the first base station at the UE exceeds a signal strength of the target base station at the UE.

10. The method of claim 1, wherein the transmitting the handover command comprises: transmitting the handover command to the UE to initiate communications between the UE and the target base station.

11. The method of claim 1, wherein the plurality of base station measurement reports comprise an identification and an energy measurement of at least one of a non-serving base station or a non-serving wireless local area network (WLAN) access point (AP).

12. The method of claim 11, wherein the plurality of base station measurement reports further comprise preamble detection information for at least one of the non-serving base station or the non-serving WLAN AP.

13. The method of claim 11, wherein the plurality of base station measurement reports are received via a backhaul link.

14. The method of claim 1, wherein the UE measurement report comprises an energy measurement associated with one or more of the second signals received at the UE from at least one of the one or more second devices.

15. The method of claim 14, wherein the UE measurement report comprises a plurality of measurements taken on a plurality of frequencies of the unlicensed radio frequency spectrum band that are different from a frequency of the first base station.

16. The method of claim 14, wherein the UE measurement report comprises a plurality of measurements taken at time intervals having a duration selected to allow the UE to perform measurements of at a least one of a beacon signal for wireless local area network (WLAN) access point (AP) transmissions or a demodulation reference signal (DRS) signal for other base station transmissions.

17. The method of claim 1, wherein the determining to handover the UE is based at least in part on a loading metric associated with the target base station.

18. The method of claim 17, wherein the loading metric comprises channel occupancy information associated with the target base station.

19. The method of claim 1, wherein the target base station is selected based at least in part on the target base station being in an energy detection range or preamble detect range of an interfering non-serving base station or an interfering non-serving wireless local area network (WLAN) access point (AP).

20. An apparatus for wireless communications at a wireless device, comprising:
a processor;
memory in electronic communication with the processor; and
the processor and memory configured to:
receive, at a first base station, a plurality of base station measurement reports, each of the plurality of base station measurement reports received from one of a plurality of base stations, the plurality of base station measurement reports including information associated with one or more first devices that transmits first signals using an unlicensed radio frequency spectrum band, and the one or more first devices different from the plurality of base stations;
receive, at the first base station, a user equipment (UE) measurement report from a UE, the UE measurement report including information associated with one or more second devices that transmits second signals on the unlicensed radio frequency spectrum band, and the one or more second devices different from the UE;
determine, at the first base station, that the one or more first devices or the one or more second devices are outside of an energy detection range of the first base station based at least in part on the plurality of base station measurement reports and the UE measurement report;
determine, at the first base station, to handover the UE based at least in part on the determination that the one or more first devices or the one or more second devices are outside of the energy detection range of the first base station;
select, at the first base station, a target base station from among the plurality of base stations, wherein the selecting is based at least in part on the one or more first devices or the one or more second devices that are outside the energy detection range of the first base station being within a second energy detection range of the target base station; and
transmit, from the first base station, a handover command based at least in part on the determination to handover the UE to the target base station.

21. The apparatus of claim 20, wherein the one or more first devices comprise one or more of a non-serving base station or a non-serving wireless local area network (WLAN) access point (AP).

22. The apparatus of claim 20, wherein the one or more second devices comprise one or more of a non-serving base station or a non-serving wireless local area network (WLAN) access point (AP).

23. The apparatus of claim 20, wherein the one or more first devices are within an energy detection range of the one base station of the plurality of base stations that provided a base station measurement report of the plurality of base station measurement reports.

24. The apparatus of claim 20, wherein the one or more second devices are within an energy detection range of the UE.

25. The apparatus of claim 20, wherein the processor and memory are configured to:
receive signals at time intervals that are different from time intervals of transmissions of at least one of the one or more first devices or the one or more second devices.

26. The apparatus of claim 20, wherein the processor and memory are configured to:
determine that at least one of the one or more first devices or the one or more second devices is causing interference at the UE with signals transmitted from the first base station on the unlicensed radio frequency spectrum band; and
the processor and memory further configured to determine that the target base station can transmit signals to the UE with reduced interference relative to the first base station.

27. The apparatus of claim 26, wherein the processor and memory are configured to:
determine that a signal strength of transmissions of the target base station at the UE exceeds a threshold value;
determine that the target base station is within an energy detection range of the at least one of the one or more first devices or the one or more second devices that is causing the interference at the UE;
or determine that the target base station is within an energy detection range of the first base station.

28. The apparatus of claim 20, wherein the processor and memory are configured to:
transmit the handover command to the UE to initiate communications between the UE and the target base station.

29. An apparatus for wireless communication, comprising:
means for receiving, at a first base station, a plurality of base station measurement reports, each of the plurality of base station measurement reports received from one of a plurality of base stations, the plurality of base station measurement reports including information associated with one or more first devices that transmits first signals using an unlicensed radio frequency spectrum band, and the one or more first devices different from the plurality of base stations;

means for receiving, at the first base station, a user equipment (UE) measurement report from a UE, the UE measurement report including information associated with one or more second devices that transmits second signals using the unlicensed radio frequency spectrum band, and the one or more second devices different from the UE;

means for determining, at the first base station, that the one or more first devices or the one or more second devices are outside of an energy detection range of the first base station based at least in part on the plurality of base station measurement reports and the UE measurement report;

means for determining, at the first base station, to handover the UE based at least in part on the determination that the one or more first devices or the one or more second devices are outside of the energy detection range of the first base station;

means for selecting, at the first base station, a target base station from among the plurality of base stations, wherein the selecting is based at least in part on the one or more first devices or the one or more second devices that are outside the energy detection range of the first base station being within a second energy detection range of the target base station; and means for transmitting, from the first base station, a handover command based at least in part on the determination to handover the UE to the target base station.

30. A non-transitory computer-readable medium storing code for communication, the code comprising instructions executable to:

receive, at a first base station, a plurality of base station measurement reports, each of the plurality of base station measurement reports received from one of a plurality of base stations, the plurality of base station measurement reports including information associated with one or more first devices that transmits first signals using an unlicensed radio frequency spectrum band, and the one or more first devices different from the plurality of base stations;

receive, at the first base station, a user equipment (UE) measurement report from a UE, the UE measurement report including information associated with one or more second devices that transmits second signals using the unlicensed radio frequency spectrum band, and the one or more second devices different from the UE;

determine, at the first base station, that the one or more first devices or the one or more second devices are outside of an energy detection range of the first base station based at least in part on the plurality of base station measurement reports and the UE measurement report;

determine, at the first base station, to handover the UE based at least in part on the determination that the one or more first devices or the one or more second devices are outside of the energy detection range of the first base station;

select, at the first base station, a target base station from among the plurality of base stations, wherein the selecting is based at least in part on the one or more first devices or the one or more second devices that are outside the energy detection range of the first base station being within a second energy detection range of the target base station; and transmit, from the first base station, a handover command based at least in part on the determination to handover the UE to the target base station.

* * * * *